United States Patent [19]

Watanabe et al.

[11] Patent Number: 5,568,479
[45] Date of Patent: Oct. 22, 1996

[54] SYSTEM OF CONTROLLING MISCELLANEOUS MEANS ASSOCIATED WITH EXCHANGE

[75] Inventors: Yoshihiro Watanabe; Satoshi Kakuma; Sumie Morita; Yuzo Okuyama; Kenichi Okabe, all of Kawasaki, Japan

[73] Assignee: Fujitsu Limited, Kanagawa, Japan

[21] Appl. No.: 541,395

[22] Filed: Oct. 10, 1995

Related U.S. Application Data

[63] Continuation of Ser. No. 189,510, Jan. 31, 1994, abandoned.

[30] Foreign Application Priority Data

Jun. 15, 1993 [JP] Japan ................... 5-143343

[51] Int. Cl.6 .............. H04L 12/56; H04J 3/12
[52] U.S. Cl. ............. 370/60.1; 370/68.1; 370/110.1
[58] Field of Search ................. 370/58.1, 58.2, 370/58.3, 60, 60.1, 68.1, 94.1, 94.2, 110.1

[56] References Cited

U.S. PATENT DOCUMENTS

| | | |
|---|---|---|
| 4,993,018 | 2/1991 | Hajikano et al. . |
| 5,182,750 | 1/1993 | Bales et al. ............. 370/110.1 |
| 5,255,266 | 10/1993 | Watanabe et al. . |
| 5,280,483 | 1/1994 | Kamoi et al. . |
| 5,303,236 | 4/1994 | Kunimoto et al. ............ 370/68.1 |
| 5,313,453 | 5/1994 | Uchida et al. . |
| 5,315,588 | 5/1994 | Kajiwara et al. . |
| 5,335,222 | 8/1994 | Kamoi et al. . |
| 5,339,318 | 8/1994 | Tanaka et al. ............. 370/110.1 |
| 5,343,462 | 8/1994 | Sekihata et al. . |
| 5,444,699 | 8/1995 | Watanabe . |

OTHER PUBLICATIONS

K. Hajikano et al., "Asynchronous Transfer Mode Switching Architecture for Broad ISDN", ICC, '88, Jun. 1988, pp. 0911–0915.
Y. Kato, et al., "A VLSIC for the ATM Switching System", Proceedings ISS '90, May 1990, vol. III, pp. 27–32.
A. Day, "International Standardization of BISDN", IEE LTS, vol. 2, No. 3, Aug. 1991.
K. Chipman, "High Performance Applications Development for B–ISDN", Proceeding ISS '92, Oct. 1992, vol. 1, pp. 22–26.

*Primary Examiner*—Wellington Chin

[57] ABSTRACT

The present invention relates to a system for controlling a miscellaneous device such as a remote device associated with an exchange which handles a fixed length cell with a control field and an information field. The object of the invention is to offer a system where an exchange can control a miscellaneous device such as a remote device in accordance with the feature of the exchange. The exchange includes a call processor, a switch and a signal device. In order to control the miscellaneous device, a path is formed between the signal device and the miscellaneous device. Control information from the call processor is cellulated. The path notifies the miscellaneous device of the control information including cell via the switch to control the miscellaneous device by the exchange.

35 Claims, 22 Drawing Sheets

HCV: HEADER CONVERTER UNIT
UPC: USAGE PARAMETER CONTROL

SYSTEM OF CONTROLLING MISCELLANEOUS MEANS ASSOCIATED WITH EXCHANGE

This is a continuation of application Ser. No. 08/189,510, filed Jan. 31, 1994, now abandoned.

BACKGROUND OF THE INVENTION

1) Field of the Invention

The present invention relates to a system for controlling miscellaneous means associated with an exchange, the exchange handling a fixed length cell with a control field and an information field, wherein the miscellaneous means such as a remote device is controlled that is associated with an exchange including a call processor, a switch and a signal device.

2) Description of the Related Art

An ATM (asynchronous transfer mode) exchange is categorized as an exchange which handles a fixed length cell with a control field and an information field. The ATM exchange technology has been agreed as the next generation exchange system by the CCITT (International Telegraph and Telephone Consultative Committee). The ATM exchange technology has been aggressively studied in many institutions to realize as the broadband ISDNs (Integrated Services Digital Networks).

It may be considered that a remote device such as concentration equipment is arranged as an element of an ATM exchange in an intra-office. However, in the ATM exchange technology, the remote device control system has not been realized at present stage. Hence it is not possible to realize a path connection technology.

In the STM (Synchronous Transfer Mode) exchange, an exclusive channel (time slot) is arranged between the remote device and the exchange body to control the remote device.

However, since the ATM exchange transfers asynchronously information using a cell with a fixed data length, the time slot used in the STM exchange cannot identify cells. The fact requires to develop a system where a miscellaneous device such as a remote device is controlled according to the feature of the ATM exchange.

SUMMARY OF THE INVENTION

The present invention is made to overcome the above mentioned problems. An object of the present invention is to provide a system for controlling miscellaneous means associated with an exchange, the exchange handling a fixed length cell with a control field and an information field, wherein the miscellaneous device such as a remote device can be controlled by the exchange and in agreement with the feature of the exchange.

In order to achieve the above object, according to the present invention, the system for controlling miscellaneous means associated with an exchange handling a fixed length cell with a control field and an information field, the miscellaneous means controlled by said exchange, the exchange is characterized by a call processor, a switch, a signal device, and a path arranged between the signal device and the miscellaneous means, the signal device cellulating control information from the call processor into a control information including cell (or a call including control information), the signal device notifying the miscellaneous means of the control information including cell via the path to control the miscellaneous means.

The system for controlling miscellaneous means associated with an exchange according to the present invention is characterized in that the miscellaneous means is formed of plural groups each including miscellaneous devices, one of the miscellaneous device groups acting as a control device which once terminates control information from the exchange to control the miscellaneous device means.

Furthermore, the system for controlling miscellaneous means associated with an exchange according to the present invention is characterized in that the control information including cell includes identification information which indicates a miscellaneous device control cell.

The system for controlling miscellaneous means associated with an exchange according to the present invention is characterized in that the control information including cell has virtual path identification information or virtual channel identification information which is set to a maximum value.

The system for controlling miscellaneous means associated with an exchange according to the present invention is characterized in that the miscellaneous means includes plural miscellaneous devices to be controlled which are associated with a common route, the plural miscellaneous devices respectively allocated to divided fields of an identifier.

The system for controlling miscellaneous means associated with an exchange according to the present invention is characterized in that the miscellaneous means includes plural miscellaneous devices to be controlled which are associated with a common route, and the virtual path identification information or the virtual channel information of the control information including cell are respectively allocated to the plural miscellaneous devices from a maximum set value in decreasing order by value.

Moreover, the system for controlling miscellaneous means associated with an exchange according to the present invention is characterized in that the miscellaneous means includes plural miscellaneous devices to be controlled which are associated with a common route, one of the plural miscellaneous devices having a header conversion function converting a cell header and a path connection function setting a routing tag in the switch, whereby a first path is formed from the signal device to a miscellaneous device nearest to the signal device; a second path is formed between a rear stage miscellaneous devices by utilizing the first path; and a third path is formed between the second path and a rear stage miscellaneous device by utilizing the second path, whereby an path route can be extended toward rear stage miscellaneous devices.

The system for controlling miscellaneous means associated with an exchange according to the present invention is characterized in that the path data are transferred at once to a specific miscellaneous device, the data being used for miscellaneous devices following the specific miscellaneous device to form a path to control the multistage miscellaneous devices.

The system for controlling miscellaneous means associated with an exchange according to the present invention is characterized in that the signal device transmits control information to each of plural miscellaneous devices to be controlled, the control information being used to identify the miscellaneous devices and including virtual path identification information and virtual channel identification information.

The system for controlling miscellaneous means associated with an exchange according to the present invention is characterized in that the signal device subjects each of the miscellaneous devices to a cellulating and decellulating process, and subjects each of the miscellaneous devices to a path control process.

The system for controlling miscellaneous means associated with an exchange is characterized in that the signal device systematically subjects each of the additional devices to a cellulating or decellulating process and a path control process.

The system for controlling miscellaneous means associated with an exchange according to the present invention is characterized in that the signal device converts a cell header therefrom to satisfy the condition of the cell header information which has been received by the miscellaneous means.

The system for controlling miscellaneous means associated with an exchange according to the present invention is characterized in that the miscellaneous means sends a path establishment completion notification to the signal device when the miscellaneous means receives the path establishment cell from the signal device, the virtual path identification information or virtual channel identification information of the path establishment cell being used as the virtual path identification information or virtual channel identification information of a return cell, and the miscellaneous means sends a cell in the following step in accordance with the virtual path identification information or the virtual channel identification information to the signal device.

The system for controlling miscellaneous means associated with an exchange according to the present invention is characterized in that the miscellaneous means includes plural miscellaneous devices each which sends a cell header to the signal device to identify a cell from each miscellaneous device, the cell header from each miscellaneous device being compared with a virtual path identification information or a virtual channel identification information of a cell header sent from the signal device to each miscellaneous device to identify each miscellaneous device.

Furthermore, the system for controlling miscellaneous means associated with an exchange according to the present invention is characterized in that a cell header sent from each of the miscellaneous devices is compared with a virtual path identification information or a virtual channel identification information of a cell header sent from the signal device via a header converter unit.

The system for controlling miscellaneous means associated with an exchange according to the present invention is characterized in that an interchange of control information between the signal device and each of the miscellaneous devices is simplified by providing only a length of control information as a header of a bit of control information, and by controlling so as not to transmit the next control information to be sent till a confirmation signal returns.

Moreover the system for controlling miscellaneous means associated with an exchange according to the present invention is characterized in that an interchange of control information between the signal device and the miscellaneous means is simplified and multiplexed by adding a control information length and a sequence number as a control information header to a piece of control information and by controlling a slip of control information on way of processing with the sequence number, whereby the multiplexing process is realized.

The system for controlling miscellaneous means associated with an exchange according to the present invention is characterized in that the miscellaneous means comprises a remote device installed at a place away from the exchange.

The system for controlling miscellaneous means associated with an exchange according to the present invention is characterized in that the miscellaneous means is arranged inside the exchange.

As described above, according to the exchange miscellaneous device control system of the present invention, one or plural additional devices connected to a single link can flexibly set a control path by providing information as a cell and arranging the cell format and a header converter unit between a signal device and the miscellaneous device. As a result, the exchange can control the miscellaneous device by utilizing the path and sending the control information as a cell to the miscellaneous device. Furthermore, the present invention has the following advantages:

(1) Miscellaneous devices can be controlled in group.

(2) A miscellaneous device can identify that a cell is a control cell for itself or a user cell.

(3) When miscellaneous devices in multistage are connected in a common link, it can be identified whether a cell is a cell for itself or a cell for another miscellaneous device.

(4) When a path forming device is arranged in miscellaneous devices in multistage, a path can be formed to control post stage miscellaneous devices.

(5) A single signal device can control plural miscellaneous devices.

(6) Miscellaneous devices in multistage can be controlled.

(7) A device with a function similar to that of an miscellaneous device can be arranged in the exchange. This structure can reduce hardware developing task hours and eliminate new software development because of the use of the same type control system.

DESCRIPTION OF THE PREFERRED EMBODIMENTS

Referring to the attached drawings, an explanation will be made in detail as for preferred embodiments of the miscellaneous device control system according to the present invention.

Figure 1:
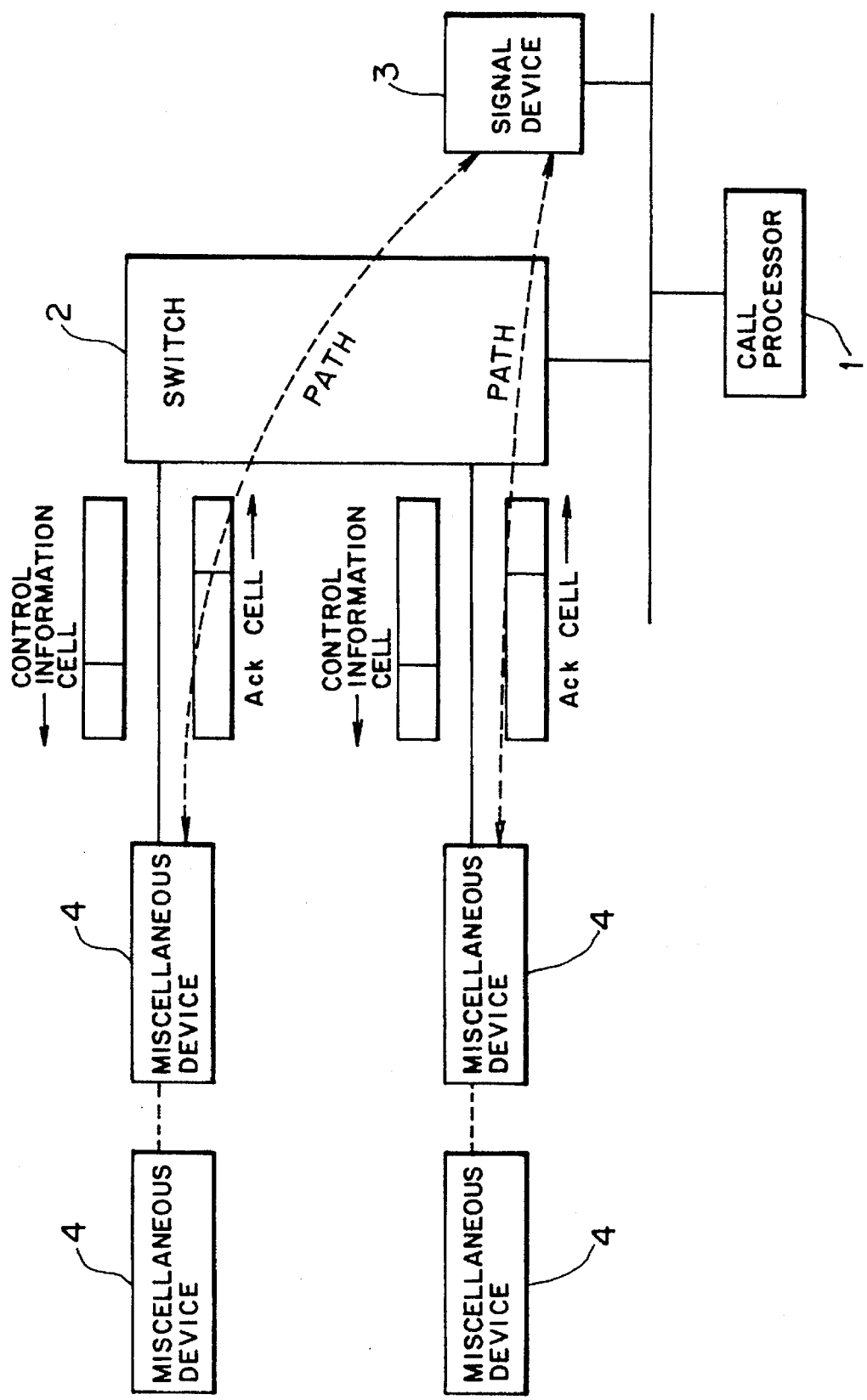
FIG. 1 is a block diagram for explaining the aspect of the present invention.

(a) The aspect of the invention:

FIG. 1 is a block diagram showing an aspect of the present invention. Referring now to FIG. 1, an exchange which handles a fixed length cell with a control field and an information field is constituted of a call processor 1, a switch 2 and a signal device 3. The miscellaneous devices 4 are associated with the exchange.

In order to control the miscellaneous device 4, the exchange operates according to the following steps of:

(1) forming a path between the signal device 3 and the miscellaneous devices 4; and (2) cellulating information from the call processor 1 and notifying the miscellaneous devices 4 of the control information including cell via the switch 2 and the path to control the miscellaneous devices 4.

Figure 2:
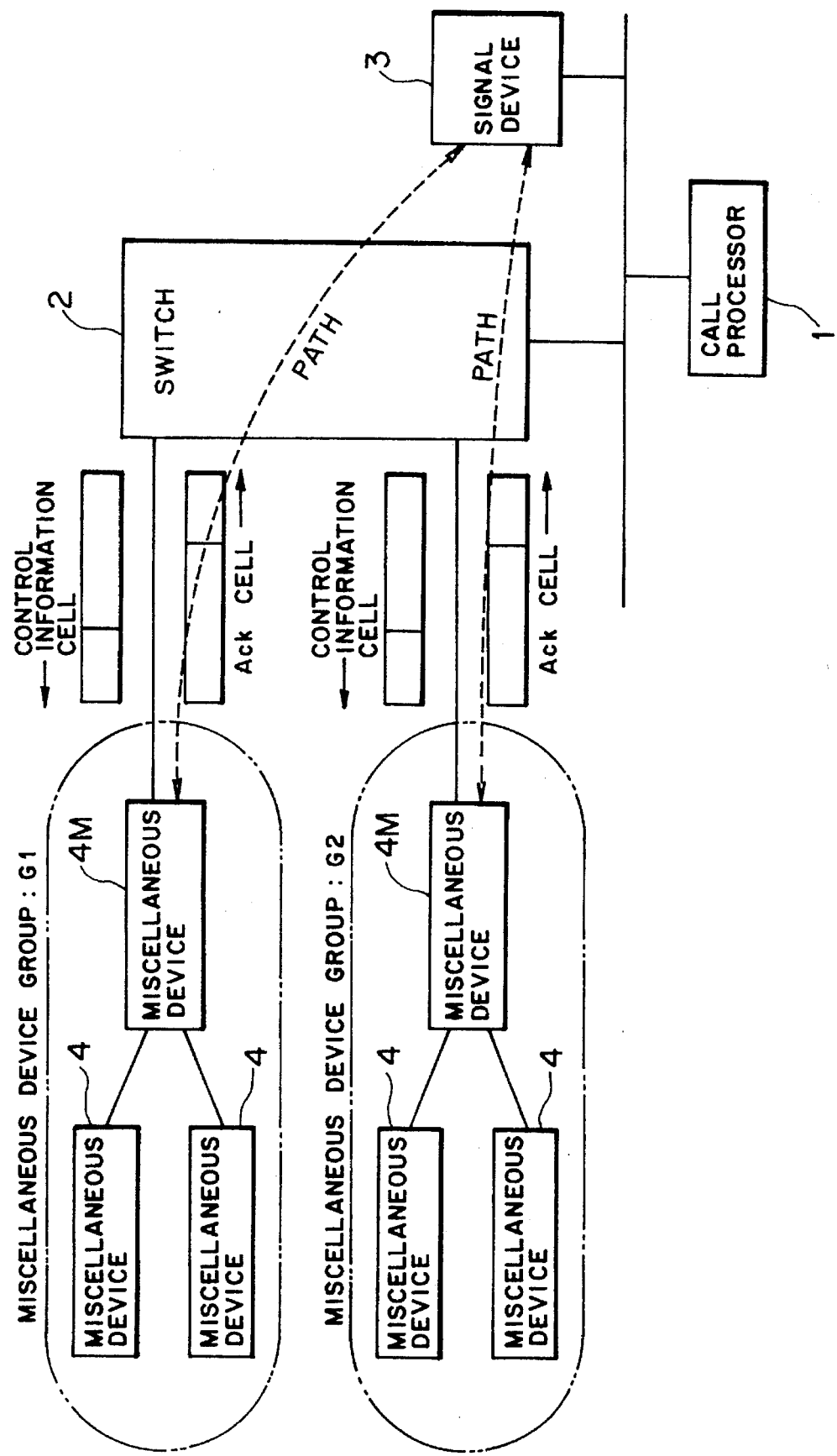
FIG. 2 is a block diagram for explaining the aspect of the present invention.

Miscellaneous device groups G1 and G2, as shown in FIG. 2, include plural miscellaneous devices 4, respectively. One of the miscellaneous devices 4 acts as a control device 4M to control the miscellaneous device group. In the miscellaneous device groups G1 and G2, the miscellaneous device 4M temporarily terminates control information from the exchange to control the miscellaneous devices 4.

Identification information indicating a miscellaneous device control cell is added to the control information including cell. The virtual path identification information or virtual channel identification information of the control information including cell may be set at a maximum value.

When plural miscellaneous devices 4 to be controlled are arranged to a common route, each of the divided fields of an identifier is allocated to each miscellaneous device, or the virtual path identification information or virtual channel identification information of a control information including cell is allocated to each miscellaneous device from the maximum set value in decreasing order by value.

When plural miscellaneous devices 4 to be controlled are arranged in the common route, one of the plural miscellaneous devices 4 having a header conversion function for converting a cell header and a path connection function for setting a routing tag in the switch 2, a path is sequentially extended to the rear stage miscellaneous devices 4. For example, a path is first formed from the signal device 3 to a miscellaneous device 4 nearest to the signal device 3. An additional path is formed to the rear stage miscellaneous device 4 via the path. Next a path is formed to further rear stage miscellaneous device 4. In this case, path data for rear miscellaneous devices 4 is transferred at once to a miscellaneous device 4 to form a path for controlling the miscellaneous devices 4 in multistage.

When plural miscellaneous devices 4 to be controlled exist, the signal device 3 can use virtual path identification information or virtual channel identification information as miscellaneous device 4 identifying information to send control information to each miscellaneous device 4.

Moreover, the signal device 3 may perform a cellulating and decellulating process to each miscellaneous device 4, together with but independently to a path control process to each miscellaneous device 4. The signal device 3 also may systematically perform the cellulating and decellulating process and the path control process to each of miscellaneous devices 4.

The signal device 3 may convert the cell header therefrom to satisfy the condition of the cell header information which has arrived to the miscellaneous device 4.

When receiving a path establishment cell from the signal device 3, the miscellaneous device 4 produces a path completion signal notification including the virtual path identification information or virtual channel identification information of the path establishment cell as virtual path identification information or virtual channel identification information for a return cell. The miscellaneous devices 4 may produce a cell to the signal device 3 based on the same virtual path identification information or virtual channel identification information. In order to identify respective cells from plural miscellaneous devices 4 sent to the signal device 3, the miscellaneous devices 4 also may be constructed so as to compare the cell header from each miscellaneous device with the virtual path identification information or virtual channel identification information of a cell header sent from the signal device 3 to each miscellaneous device. In this case, a header converter unit temporarily receives a cell from each miscellaneous device 4 to compare a cell header from the miscellaneous device with virtual path identification information or virtual channel identification information of the cell header sent from the signal device 3 to each miscellaneous device.

In order to simplify the interchange of information between the signal device 3 and miscellaneous devices 4, only the length of the control information may be added as a control information header to a bit of control information to stop the following control information to be sent till a confirmation signal returns. In order to simplify and multiplex the interchange of control information between the signal device 3 and miscellaneous devices 4, the length of control length and the sequence number may be added as a control information header to a bit of control information so that control information possibly missed during processing can be controlled with the sequence number.

The miscellaneous device may be a remote device installed at a place away from an exchange or a device installed in an exchange.

In the control system for a miscellaneous device associated with an exchange according to the present invention, as shown in FIG. 1, in order to control the miscellaneous devices 4 (a remote device separated from the exchange or a device built in the exchange) by the exchange, a path is formed between the signal device 3 and the miscellaneous device 4. The miscellaneous device 4 is controlled by cellulating control information from the call processor 1 and notifying the miscellaneous device 4 of the control information including cell via the switch 2 and the path.

As shown in FIG. 2, each of miscellaneous device groups G1 and G2 includes plural miscellaneous devices 4. The control device 4M terminates once control information from the exchange to control each miscellaneous device 4 in the miscellaneous device groups G1 and G2.

The control information cell can be distinguished from other user cells by adding identification information indicating a miscellaneous device control cell to a control information cell or by setting the virtual path identification information or virtual channel identification information of a control information cell at the maximum set value. When plural miscellaneous devices 4 to be controlled are arranged on the common route, the field of the identifier is divided to allocate each divided field as each miscellaneous device, or the virtual path identification information or virtual channel identification information of a control information cell is allocated to each miscellaneous device from the maximum set value in decreasing order by value.

When plural miscellaneous devices 4 to be controlled are arranged on a common route, one thereof having a header conversion function and a path connection function, a path is formed first from the signal device 3 to an miscellaneous device 4 nearest to the signal device 3. Furthermore, another path is formed between a rear stage miscellaneous device 4 and the nearest miscellaneous device so as to extend the path. Another path is formed between a rear stage miscellaneous device 4 and the miscellaneous device 4. In similar manner, the path is extended to the farther miscellaneous devices 4. In this case, path data used for the following miscellaneous devices 4 are forwarded at once to a miscellaneous device 4 to set a path for controlling multistage miscellaneous devices 4.

When plural miscellaneous devices 4 are controlled, the signal device 3 can transmit to each miscellaneous device 4 the virtual path identification information or virtual channel identification information as information distinguishing each miscellaneous device 4, together with control information.

The signal device 3 can perform a cellulating or decellulating process for each miscellaneous device 4 and independently a path control process. The signal device 3 can systematically perform a cellulating and decellulating process and a path control process for each miscellaneous device 4.

The signal device 3 may convert the cell header therefrom to satisfy the condition of header information from the miscellaneous device 4.

Furthermore, when receiving a path establishment cell from the signal device 3, the miscellaneous device 4 produces a path establishment completion information handled as virtual path identification information or virtual channel identification information for a return cell. Then the miscellaneous devices 4 may produce a cell to the signal device 3 based on the same virtual path identification information or virtual channel identification information. In order to identify cells from plural miscellaneous devices 4 sent to the signal device 3, the miscellaneous devices 4 also may be constructed so as to identify the cell header from each miscellaneous device with the virtual path identification information or virtual channel identification information of a cell header sent from the signal device 3 to each miscellaneous device. In this case, a header converter unit receives temporarily a cell from each miscellaneous device 4 to compare a cell header from the miscellaneous device with virtual path identification information or virtual channel identification information of the cell header sent from the signal device 3 to each miscellaneous device.

In order to simplify the interchange of control information between the signal device 3 and miscellaneous devices 4, a piece of control information may include only the length of the control information as a control information header so that the following control information is stopped till a confirmation signal returns. In order to simplify and multiplex the interchange of control information between the signal device 3 and miscellaneous devices 4, a piece of control information may include the length of control information and the sequence number as a control information header so that control information possibly missed during processing can be controlled with the sequense number.

According to the control system of a miscellaneous device associated to the exchange of the present invention, even if one or more miscellaneous devices are connected to a single link, a control path can be flexibly set by sending control information in a cell form and by arranging the cell format and header converter unit between the signal device and the miscellaneous device. Thus, passing control information as a cell via a path allows the exchange to control the miscellaneous device.

Furthermore, the present invention has the following advantages:

(1) Miscellaneous devices 4 can be controlled in group.

(2) A miscellaneous device 4 can identify that a cell is a control cell for itself or a user cell.

(3) When miscellaneous devices 4 in multistage are connected in a common link, it can be identified whether a cell is a cell for itself or a cell for another miscellaneous device 4.

(4) When a path forming device is arranged in miscellaneous devices 4 in multistage, a path can be formed to control post stage miscellaneous devices 4.

(5) A single signal device 3 can control plural miscellaneous devices 4.

(6) Miscellaneous devices 4 in multistage can be controlled.

(7) A device with a function similar to that of an miscellaneous device 4 can be arranged in the exchange. This structure can reduce hardware developing task hours and eliminate new software development because of the use of the same type control system.

Figure 3:
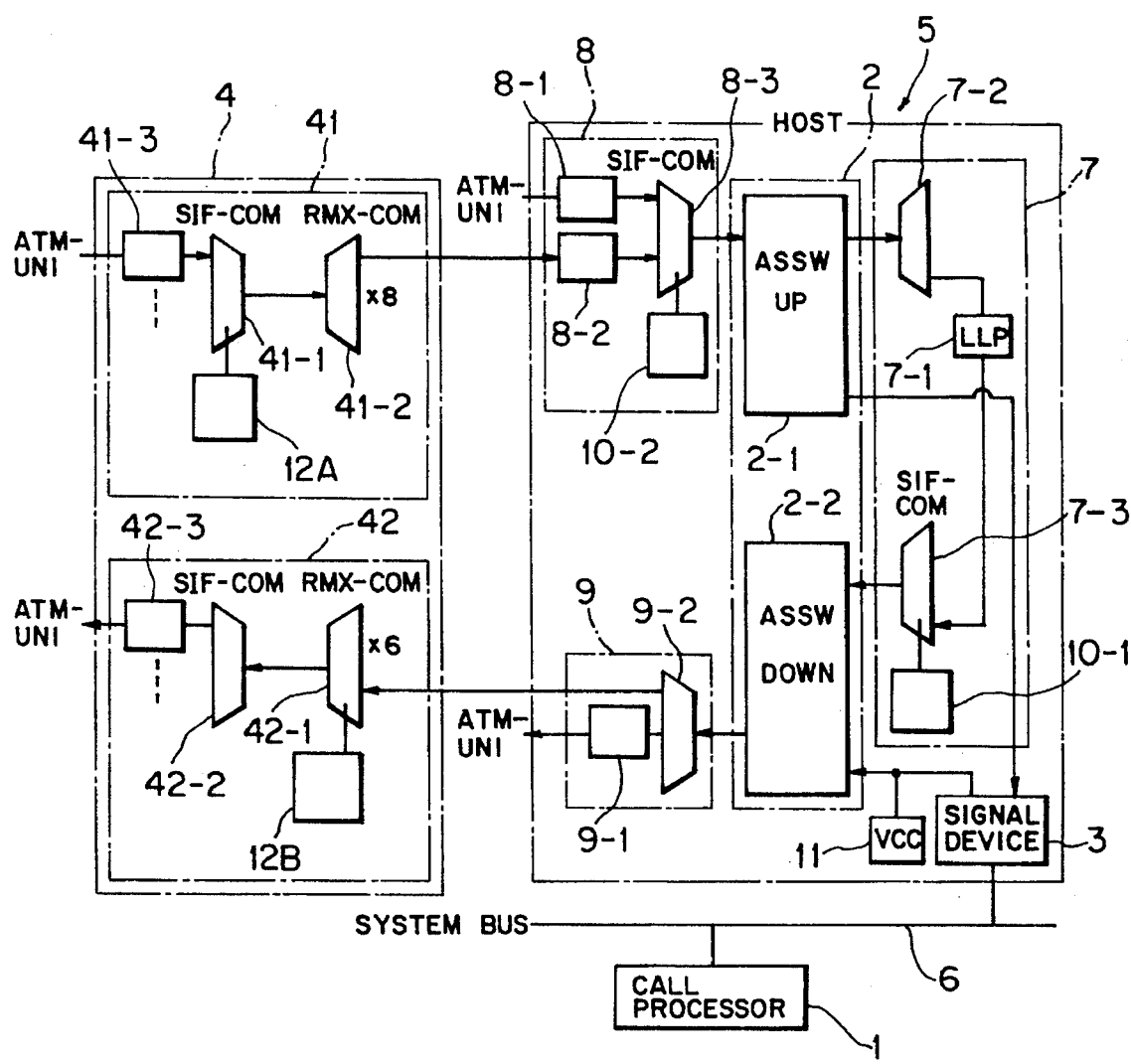
FIG. 3 is a block diagram showing a first embodiment of the present invention.

(b) An Embodiment of the Present Invention:

FIG. 3 is a block diagram showing a first embodiment of the present invention. Referring to FIG. 3, an ATM exchange which handles a fixed length cell with a control field and an information field is formed of a call processor 1, a host unit 5, a system bus 6 connecting the call processor 1 with the host unit 5.

Numeral 4 represents a remote device acting as miscellaneous device associated with the ATM exchange. The remote device 4 is concentration equipment including an up signal processing unit 41 and a down signal processing unit 42. The up signal processing unit 41 includes a multiplex unit (MUX) 41-1, a demultiplexer unit (DMUX) 41-2, and a signal input interface unit 41-3. The down signal processing unit 42 includes a multiplex unit (MUX) 42-1, a demultiplexer unit (DMUX) 42-2, and a signal output interface unit 42-3. The signal processing unit 41 includes a VCC table (vertical channel control table) 12A. The signal processing unit 42 includes a VCC table (vertical channel control table) 12B. Each of the VCC tables 12A and 12B is a memory which is used to convert virtual path identification information (VP1) or virtual channel identification information (VC1), or to attach a routing tag.

Actually, the ATM exchange accommodates plural remote devices 4 with the above structure.

The host unit 5 includes an ATM up switch unit (ASSW UP) 2-1, an ATM down switch unit (ASSW DOWN) 2-2, a signal unit 3, a signal looping unit 7, a signal input unit 8, and a signal output unit 9.

The ATM switch 2 is formed of an ATM up switch unit 2-1 and a down ATM switch unit 2-2. The ATM up switch unit 2-1 switches an up signal and the ATM down switch unit 2-2 switches a down signal.

Figure 4:
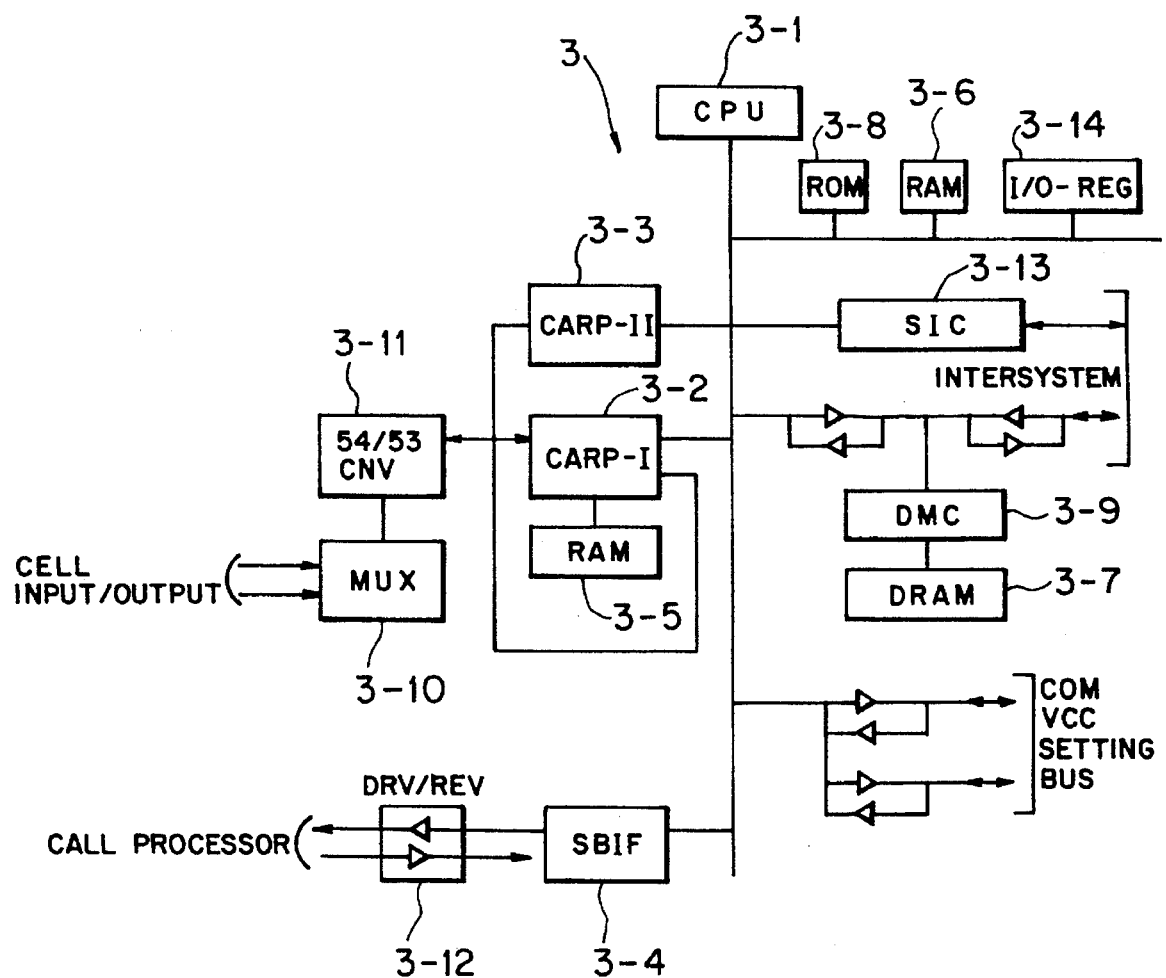
FIG. 4 is a block diagram showing a signal device according to an embodiment of the present invention.

The signal unit 3 assembles and disassembles a cell to perform an interface process between the call processor 1 and the ATM switch 2. As shown in FIG. 4, the signal unit 3 includes a cell disassembling and assembling unit (CARP-1) 3-2, data transfer units (CARP-II, SBIF) 3-3 and 3-4, each arranged to the microprocessor unit (MPU) 3-1. The signal unit 3 also includes memories such as RAMs 3-5 and 3-6, a DRAM 3-7, a ROM 3-8, a dynamic memory control unit (DMC) 3-9, a multiplex unit (MUX) 3-10, an octet converter unit (54/53 CNV) 3-11, a driver/receiver (DRV/REV) 3-12, a parallel/serial converter unit (SIC) 3-13, and an input/output register (I/O REG) 3-14.

The MPU 3-1 is a signal main control unit which controls signals between the call processor 1 and a subscriber terminal as well as an ATM path to an intra-office link access protocol (LAP). The cell disassembling and assembling unit 3-2 disassembles and assembles cells. Multiplex LSIs are used as the cell disassembling and assembling unit 3-2.

The data transfer unit 3-3 is connected to the cell disassembling and assembling unit 3-2 to transfer transmission data on the memory 3-7 to the ATM switch 2 based on the DMA operation, in the transmission process, and to forward the reception data from the cell disassembling and assembling unit 3-2 to the memory 3-7 based on the DMA process, in the reception process.

The data transfer unit 3-4 performs data transfer process across the MPU bus.

The multiplex unit (MUX) 3-10 multiplexes cells on duplexing line between the ATM switch 2 and the multiplex unit 3-10. The octet converter unit 3-11 converts the octet number of a cell. The driver/receiver 3-12 transmits data to the call processor 1 and receives data from the call processor 1. The parallel/serial converter unit 3-13 subjects data to a parallel to serial conversion to cross the duplexed system.

The signal looping unit 7 loops a signal from the ATM up switch unit 2-1 to the down ATM switch unit 2-2. The signal looping unit 7 includes a signal looping package (LLP) 7-1, a demultiplexer unit (DMUX) 7-2, and a multiplexer unit (MUX) 7-3.

The signal input unit 8 inputs a signal from a remote device 4 or a subscriber. The signal input unit 8 includes a signal input interface unit 8-1 and 8-2 and a multiplexer unit (MUX) 8-3.

Each of the signal interface units 8-1 and 8-2 converts an optical signal into an electrical signal. The signal input interface unit 8-1 accommodates directly a subscriber in the host unit 5 to set both the charging counter (CHC) and the usage parameter control (UPC). The signal input interface unit 8-2 accommodates the remote device 4 to set an UPC function execution at an initial setting time so that an UPC can be set every time a path is formed.

The signal output unit 9 outputs a signal to the remote device 4 or a subscriber. The signal output unit 9 includes a signal output interface unit 9-1 and a demultiplexer (DMUX) 9-2.

The signal output interface unit 9-1 converts an electric signal into an optical signal. The signal output interface unit 9 is directly connected to a subscriber to set only the charging counter (CHC).

The host unit 5 includes VCC tables 10-1, 10-2 and 11 each which is a memory used to convert VPI or VCI and to add a routing tag.

In order to control the remote device 4 by the ATM exchange, the intra-office LAP (ATM path) is formed between the signal device 3 and the remote device 4. The intra-office LAP is used to execute an exchange process where the signal device 3 cellulates control information from the call processor 1 and the remote device 4 is notified of the control information including cell via the ATM switch 2 so that the remote device 4 is controlled. In other words, both the control information and the acknowledge character response (ACK) to the control information as an ATM cell are interchanged between the remote device 4 and the signal device 3 to control the remote device 4. Interchanging control information in a cell form allows the control of the remote device 4.

Figure 5:
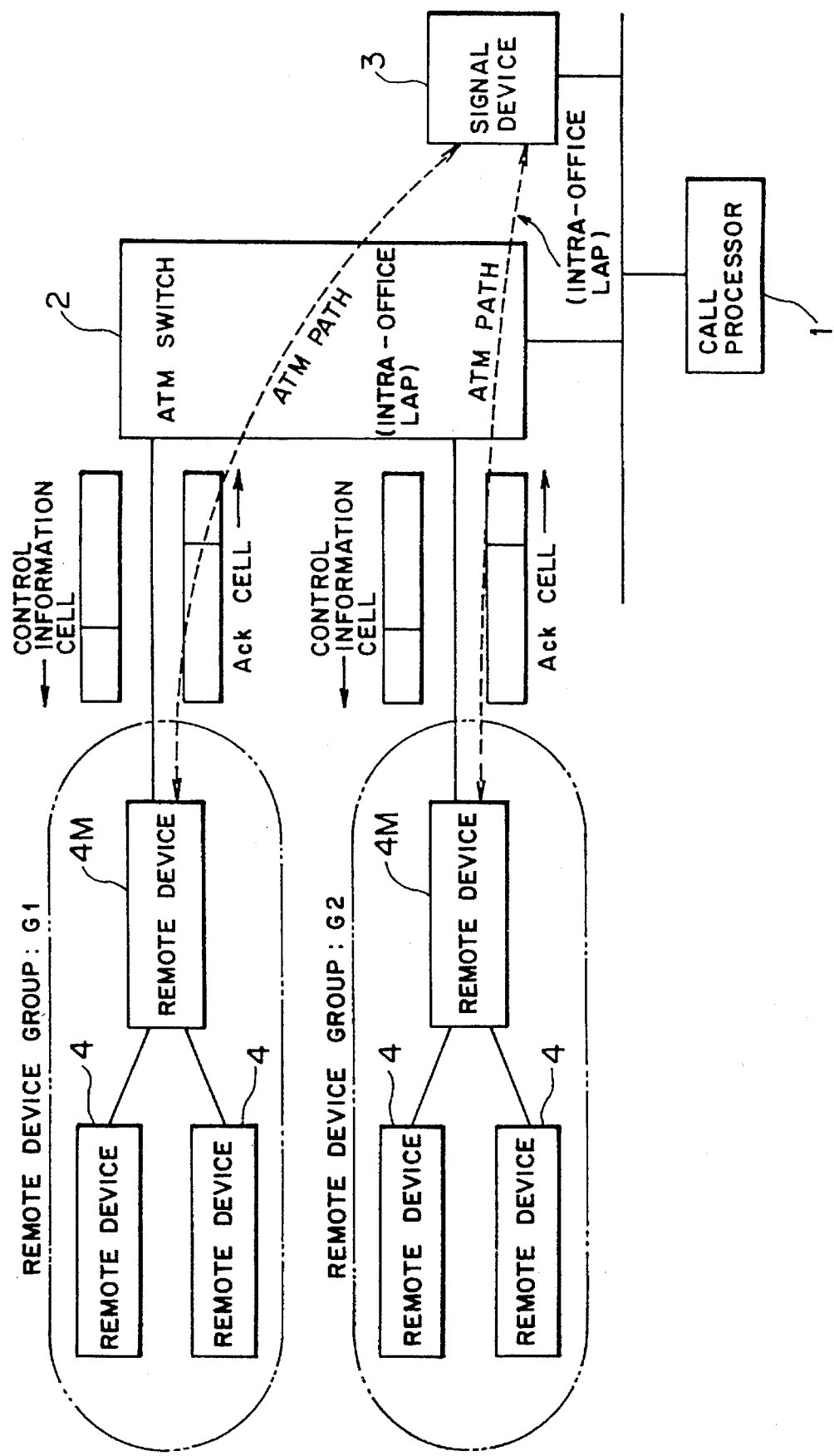
FIG. 5 is a block diagram showing a remote device group constructed according to the present invention.
Figure 6:
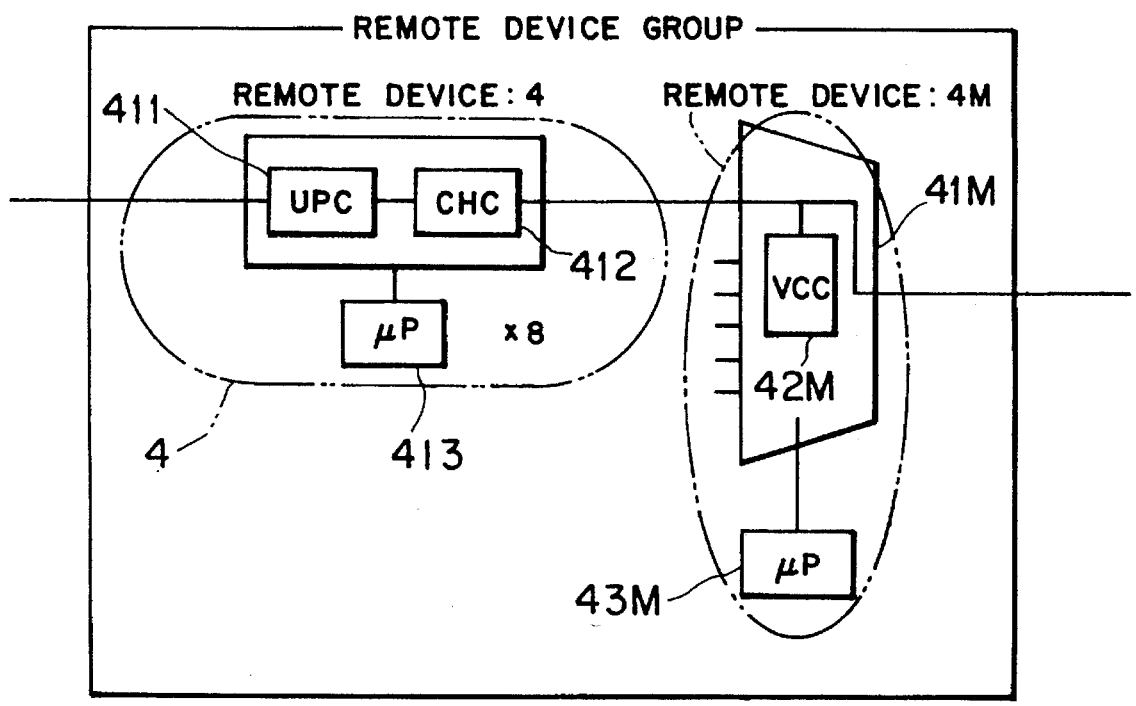
FIG. 6 is a functional block diagram showing a remote device group constructed according to the present invention.

As shown in FIG. 5, grouping plural remote devices 4 forms the remote devices G1 and G2. One of the remote devices 4 operates as a control device (group leader device) 4M for controlling the entire remote device groups G1 and G2. The control device 4M terminates temporarily control information from the ATM exchange to control each remote device 4 in the remote device groups G1 and G2. In other words, the remote devices 4 are united in different groups. A control intra-office LAP (link access protocol) is formed between the group leader device 4M and the signal control device 3 to interchange information in a cell form, thus controlling the remote devices 4 in the groups. This structure can control the remote device groups. As shown in FIG. 6, the group leader device 4M includes at least a demultiplexer unit (DMUX) 41M, a VCC table 42M and a microprocessor 43M. Each of the other remote devices 4 includes at least a charging counter (CHC) 411, a usage parameter control (UPC) unit 412 and a microprocessor 413.

Figure 7:
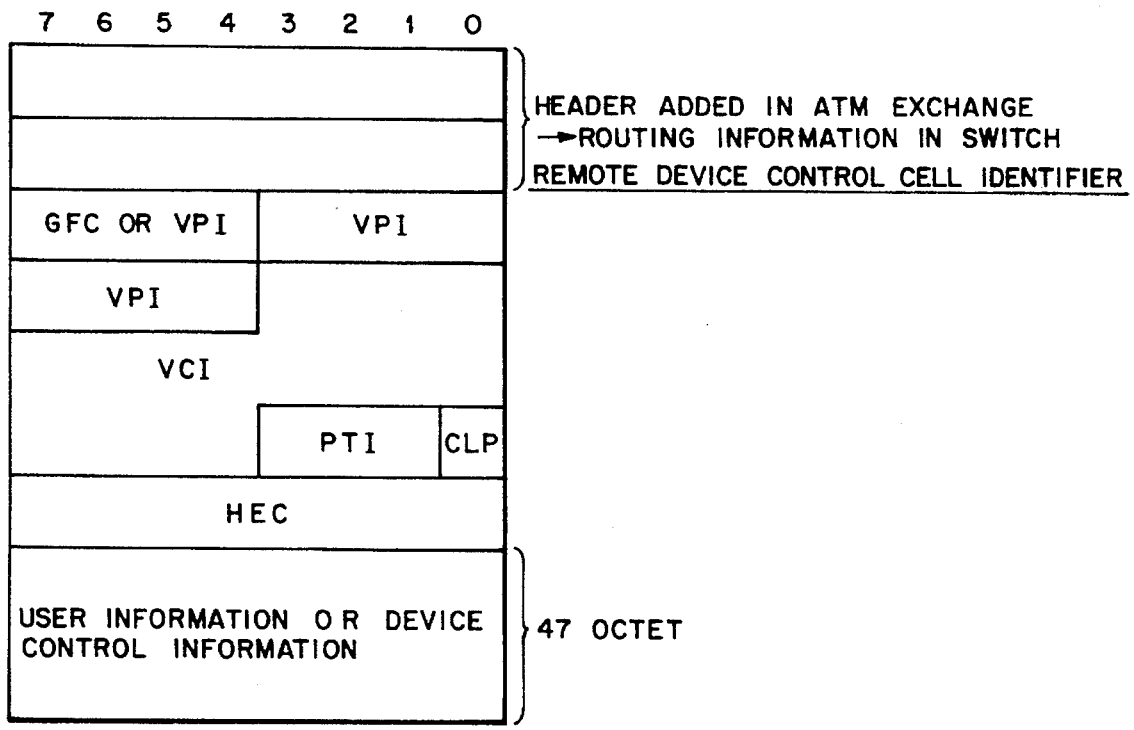
FIG. 7 is a diagram explaining a cell format according to the present invention.

In the present embodiment, adding an identifier indicating a remote device control cell to a control information including cell can distinguish the control information including cell from other common user cells. That is, FIG. 7 shows a method for identifying a cell which controls the control devices 4 in the ATM exchange. In FIG. 7, the overhead unit with an identifier of a cell in the switch is utilized to distinguish the cell from other common cells.

Figure 8:
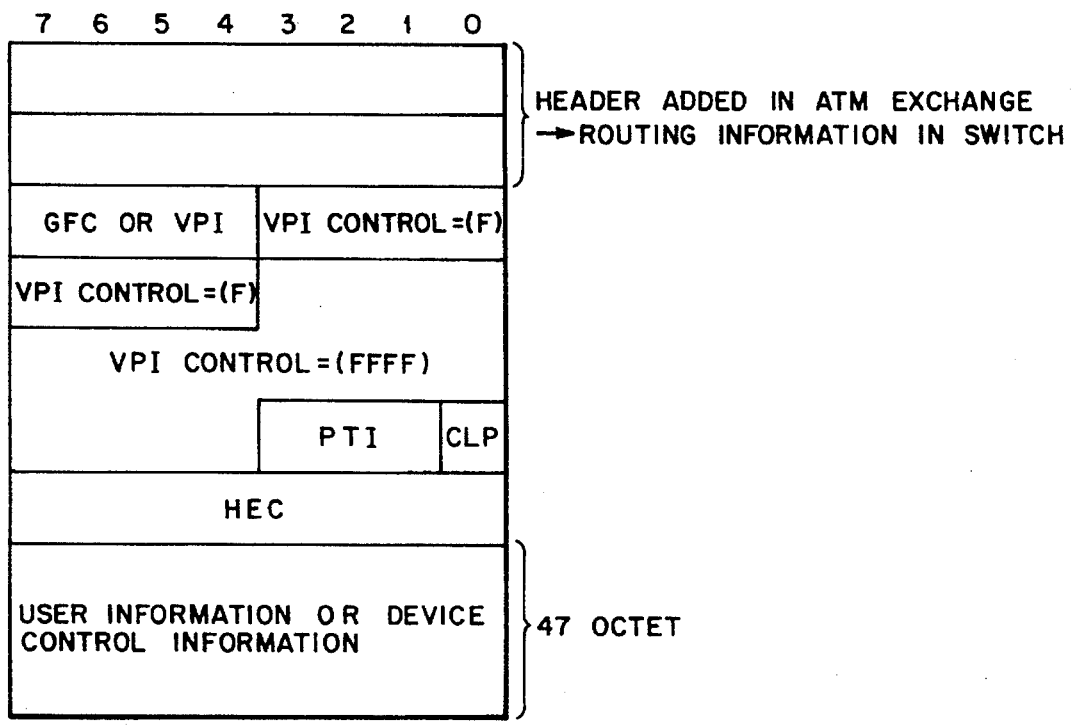
FIG. 8 is a diagram for explaining a cell format according to the present invention.

As shown in FIG. 8, when the VP1 and VCI regions of a cell in the ATM exchange have the largest set values (FFF and FFFF) of the control information including cell, respectively, it can be distinguished from other common user cells. The remote control VPI and VCI are used at the largest set values (FFF and FFFF), respectively, because the CCITT Recommendation recommends that user cells VPI and VCI should start from smaller values. For that reason, the remote device can certainly recognize whether a cell is a self control cell or a user cell.

Figure 9:
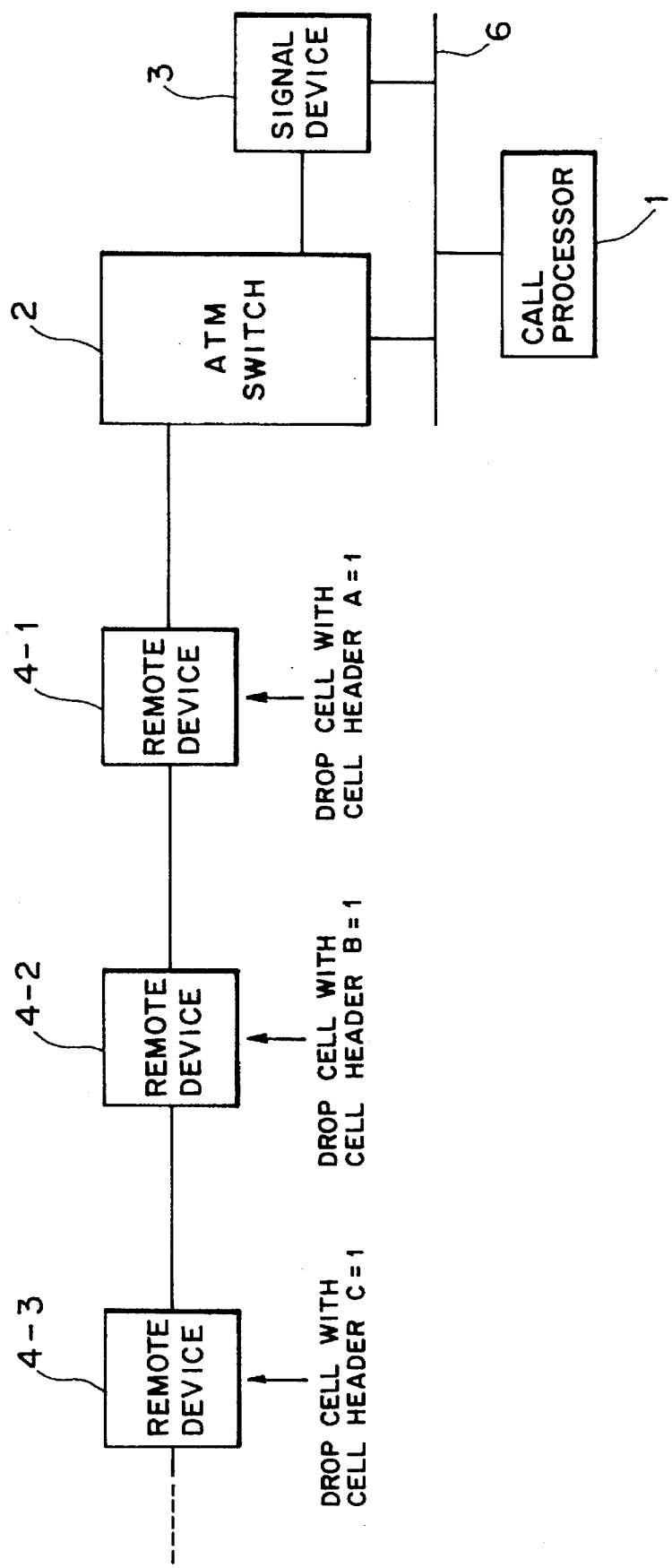
FIG. 9 is a block diagram showing a remote device arranged along a line according to the present invention.
Figure 10:
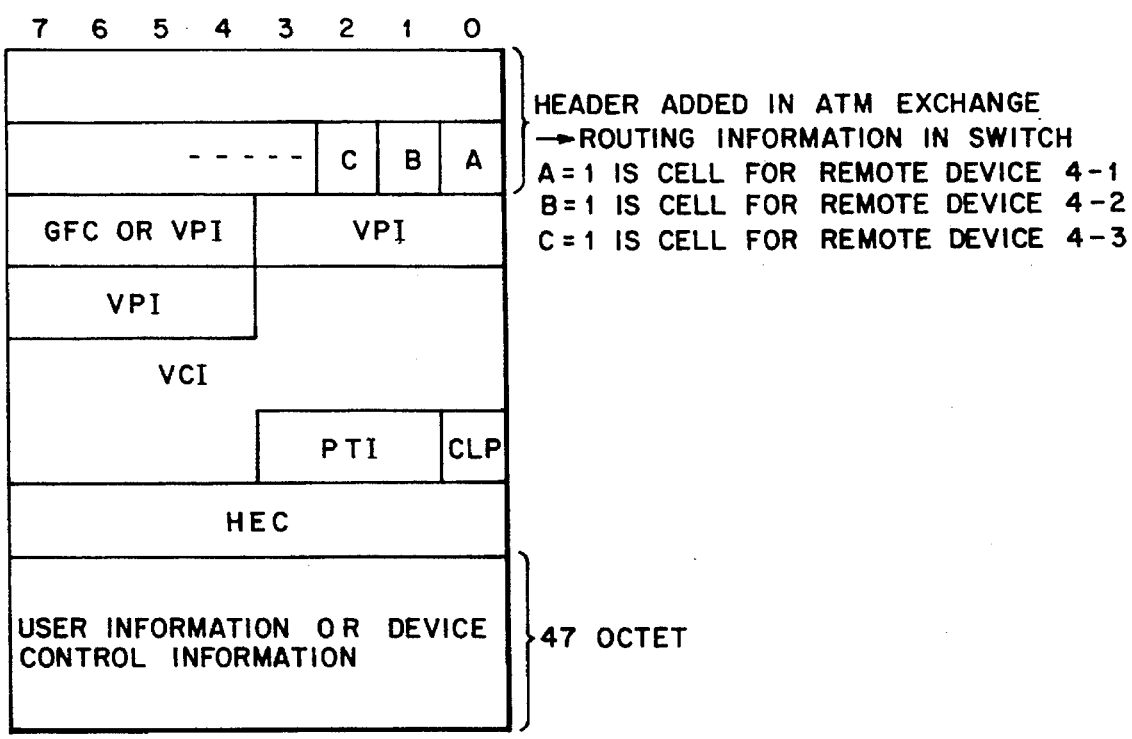
FIG. 10 is a diagram for explaining a cell format according to the present invention.

Plural remote devices 4-1, 4-2, 4-3, . . . to be controlled, as shown in FIG. 9, associated with a common route can be controlled by dividing the identifier to fields A, B, C, . . . and by allocating the divided fields for remote devices as shown in FIG. 10. That is, even when being connected in a multistage on a common link, as shown in FIG. 9, the remote devices 4-1, 4-2, 4-3, . . . can be controlled by the plural control cell identifiers, as shown FIG. 10.

Figure 11:
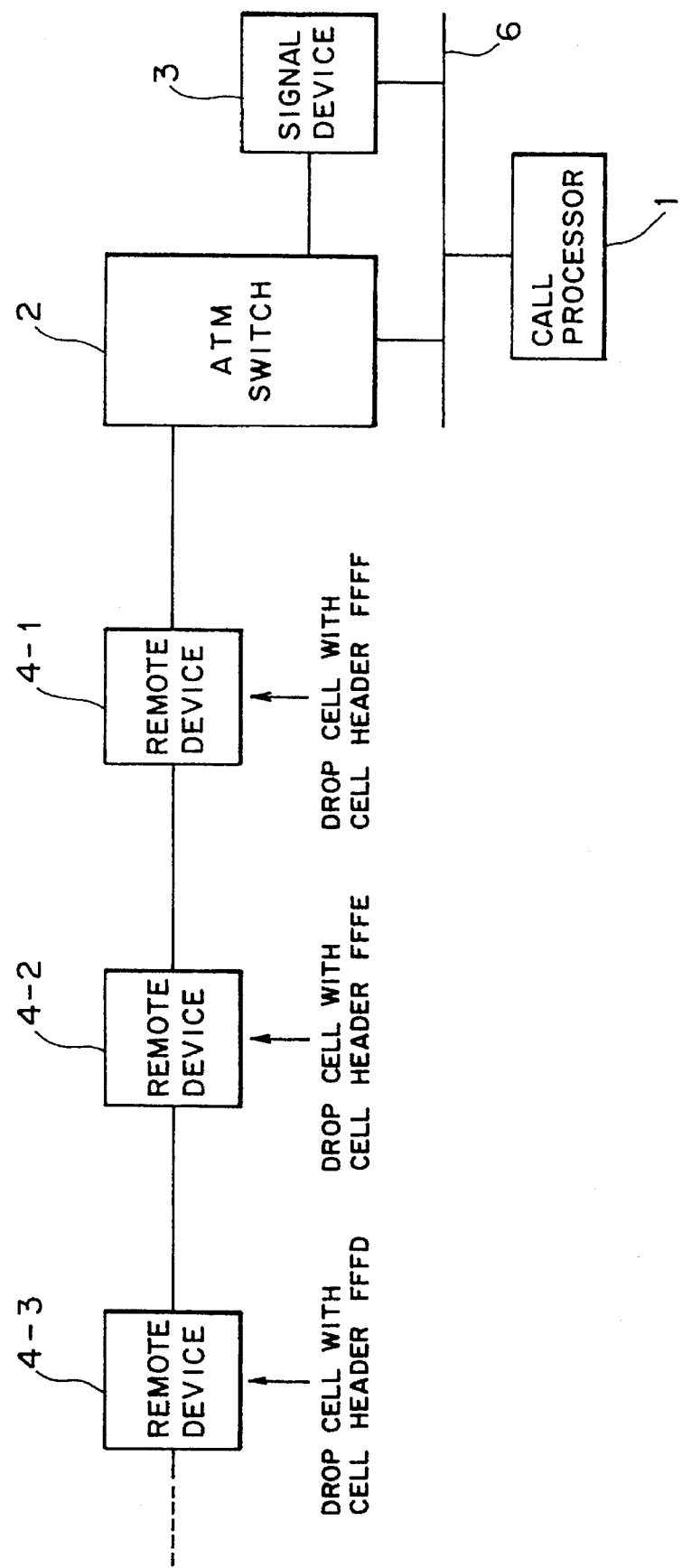
FIG. 11 is a block diagram showing a remote device arranged along a line according to the present invention.
Figure 12:
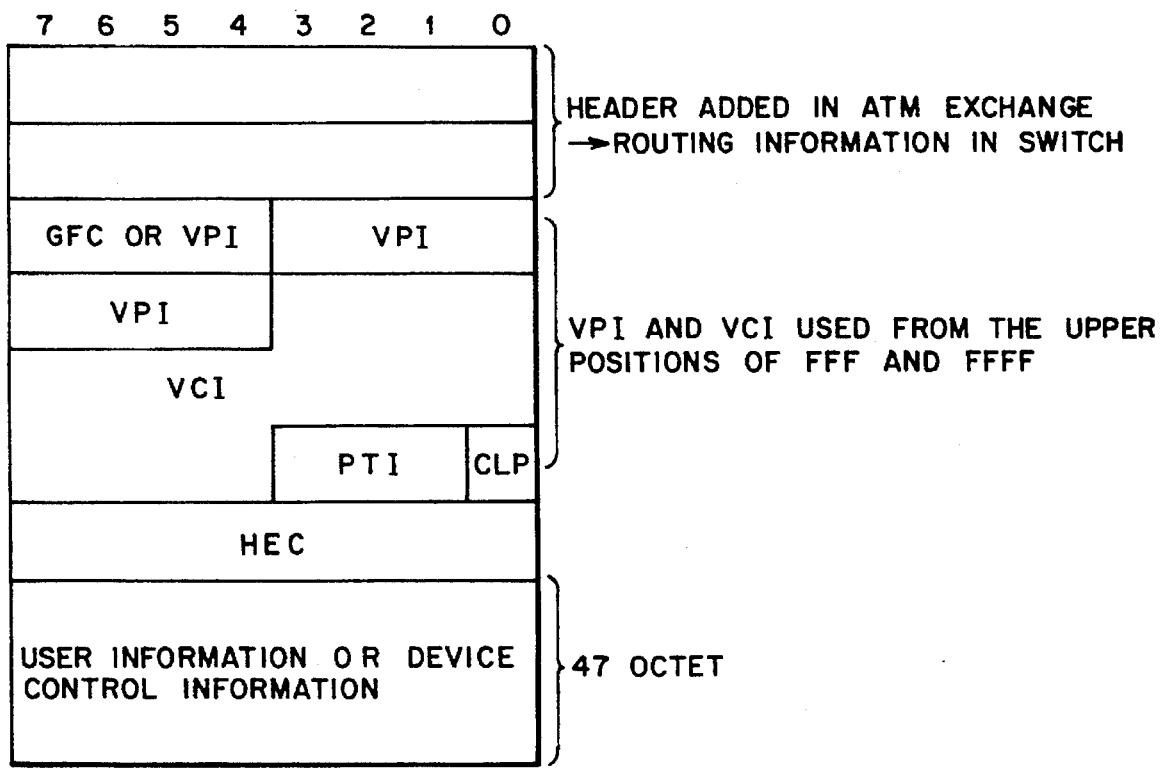
FIG. 12 a diagram for explaining a cell format according to the present invention.

When plural remote devices 4-1, 4-2, 4-3, . . . to be controlled, as shown in FIG. 11, are arranged to a common route, they can be controlled by allocating for remote devices the VPI and VCI of the control information including cells from the largest set values (FFF and FFFF) in decreasing order toward smaller values (FFF, FFFF; FFE, FFFE; FFD, FFFD, . . . ), as shown in FIG. 12. In this case, even when being connected in a multistage on a common link, as shown in FIG. 11, have plural control cell identifiers, the remote devices 4-1, 4-2, 4-3, . . . can be controlled by the plural control cell identifiers, as shown FIG. 12.

Hence even when the remote device are connected in a multistage form to a common link, it can be certainly recognized whether a cell is a self cell or another remote cell.

Figure 13:
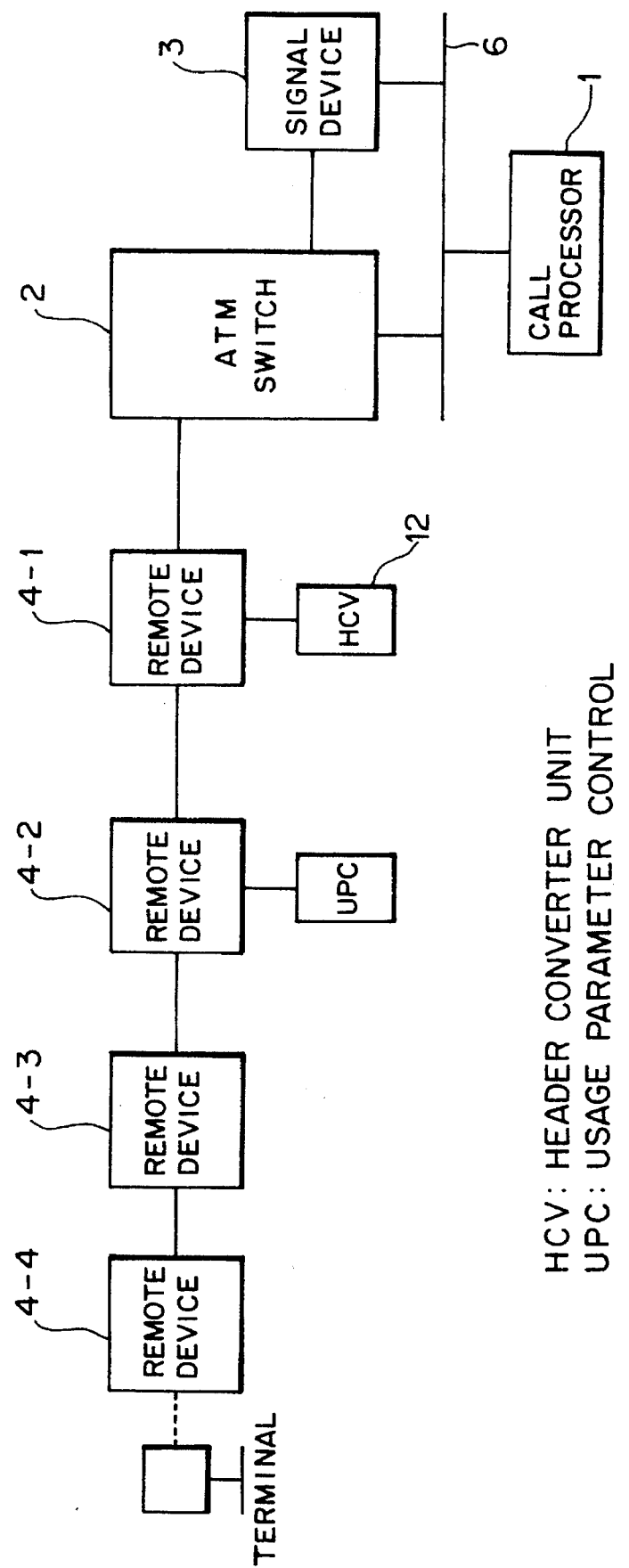
FIG. 13 is a diagram showing a remote device arranged along a line according to the present invention.
Figure 14:
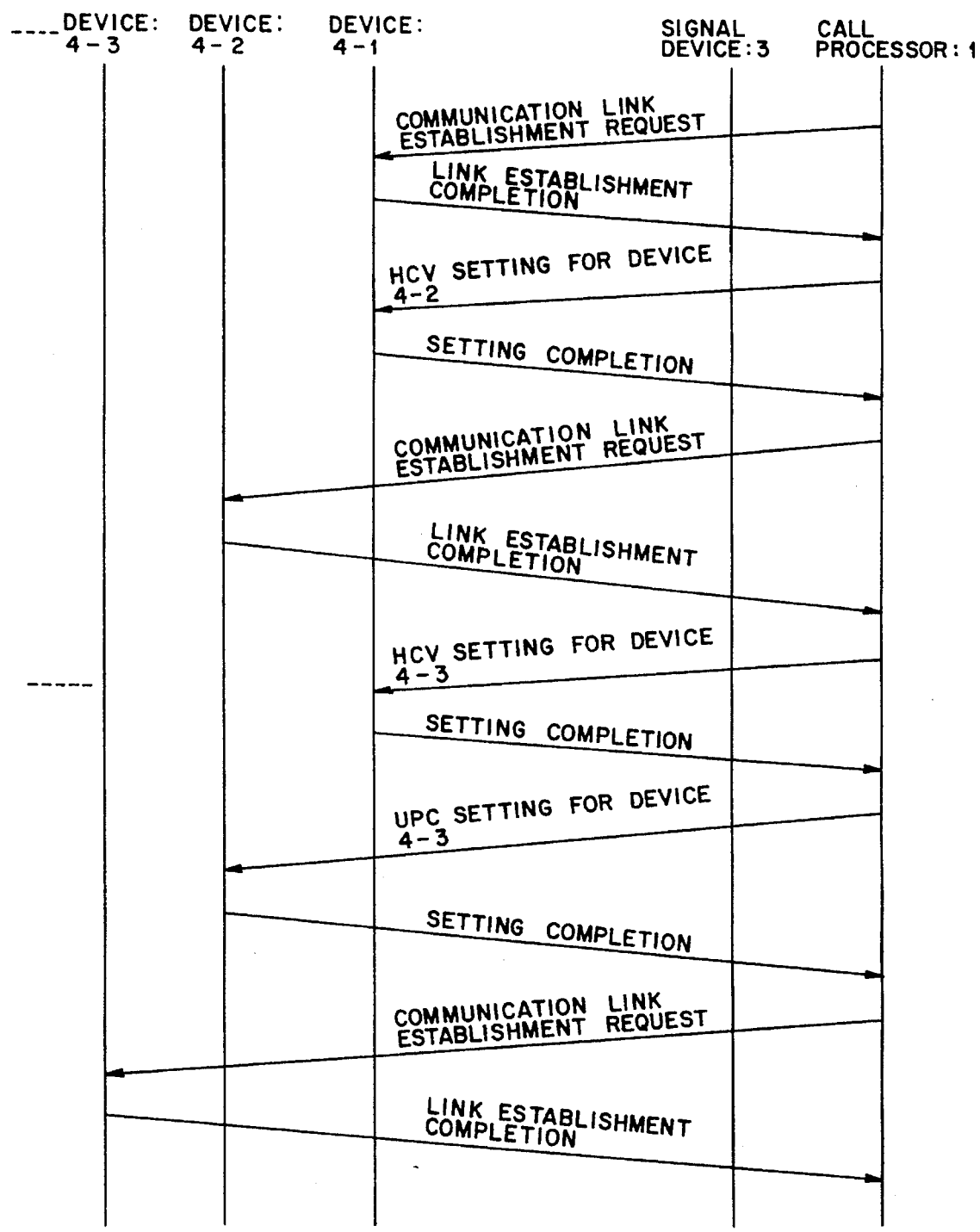
FIG. 14 is a diagram for explaining a signal sequence according to the present invention.

In the similar manner, plural remote devices to be controlled are arranged in a multistage to a common route (refer to numerals 4-1, 4-2, 4-3 and 4-4 in FIG. 13), the remote device 4-1 having a header converter unit (HCV device and VCC Table) 12 (having the functions of the VCC Tables 12A and 12B in FIG. 3), the remote device 4-1 including a header conversion function for converting the ATM cell header and a path connecting function for setting a routing tag in the ATM switch (refer to FIG. 13). In this case, an intra-office LAP is formed from the signal device 3 to the remote device 4-1 nearest to the signal device 3 and is utilized to form an additional intra-office LAP for the remote device 4-2 in the rear stage. Furthermore, the additional intra-office LAP is used to form a further another intra-office LAP for the remote device 4-3. Intra-office LAPs can be formed to rear remote devices one after another. The procedure to extend a control path is shown in FIG. 14.

Figure 15:
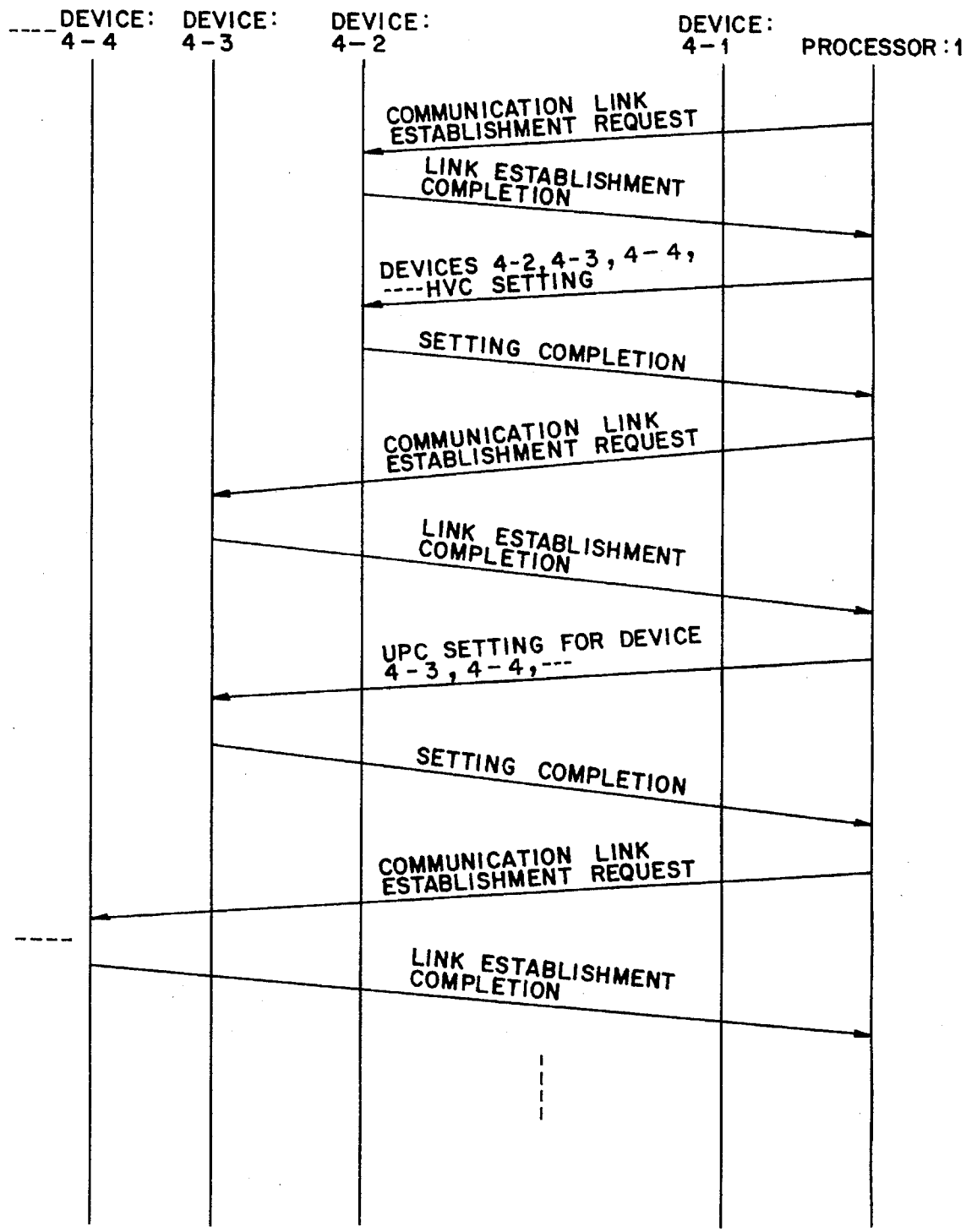
FIG. 15 is a diagram for explaining a signal sequence according to the present invention.

LAP data (path data) for the remote devices 4-2, 4-3, . . . may be forwarded at the same time to the remote device 4-1 to set the path for controlling the remote devices in multistage. FIG. 15 shows a procedure for forming a control path to a remote device under the same condition as that in FIGS. 13 and 14. Information for forming a path to a rear stage remote device is once transferred to the remote device preceding the rear stage remote device.

Therefore, when the multistage remote devices includes a path connecting device, the above structure can form an intraoffice LAP to control post stage remote devices.

Figure 16:
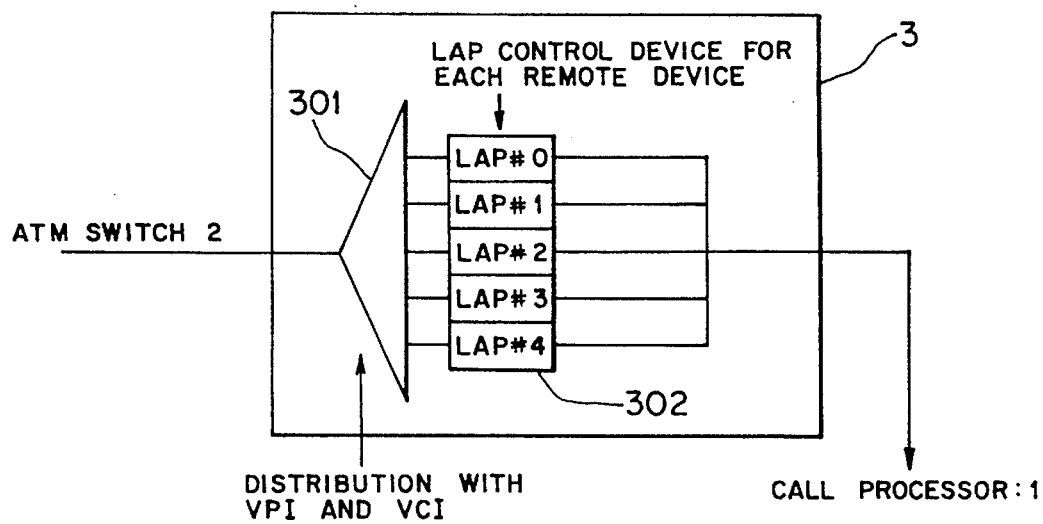
FIG. 16 is a block diagram showing the function of a signal device according to the present invention.

On the other hand, plural remote devices 4 are to be controlled, the signal device 3 can use information VPI and VCI for distinguishing remote devices 4 as control information for each remote device. FIG. 16 shows the general functional configuration of the signal device 3. In FIG. 16, the input cell is allocated in accordance with information VPI and VCI by the switching unit 301 of the signal device 3 and then inputted to the LAP control unit 302 corresponding to each remote device, whereby the signal device 3 can identify the remote device 4.

Figure 17:
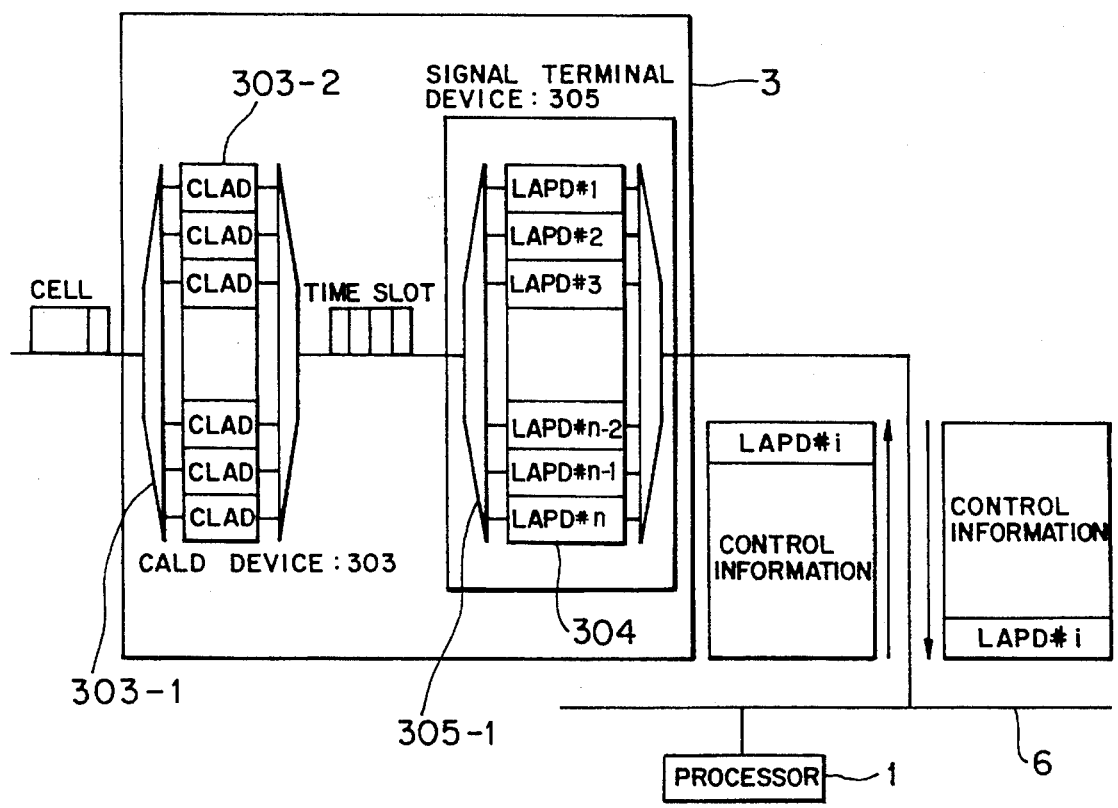
FIG. 17 is a diagram showing the function of a signal device according to the present invention.

In this case, the signal device 3 subjects each remote device to a cellulating and decellulating process and subjects independently each remote device to an intra-office LA controlling process. The signal device 3, shown in FIG. 17, includes separately a cellulating and decellulating device (CLAD device) 303 arranged to each remote device, and a LAP control device (LAPD) 304. As shown in FIG. 17, the DMUX unit 303-1 in the CLAD device 303 separates input information VPI and VCI by using the inputs VP1 and VPC. Each divided information is inputted to each of CLAD units 303-2 arranged to each of corresponding remote devices. The divided information is carried with a time slot. The DMUX unit 305-1 in the signal terminal device 305 divides further the divided information with the time slot. The divided information is allocated to the LAPD control device 304 corresponding to each remote device so that remote devices can be identified.

Figure 18:
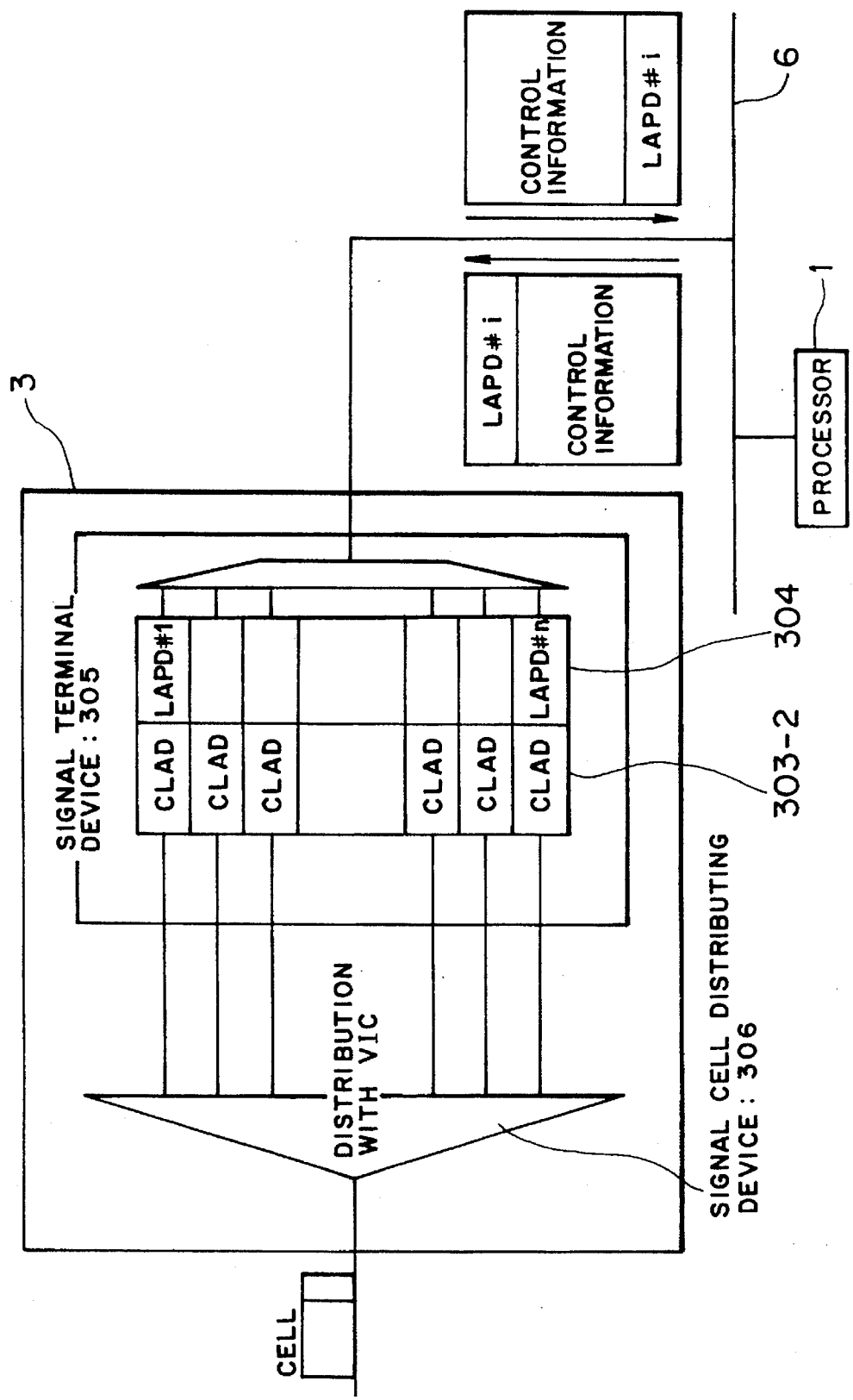
FIG. 18 is a diagram showing the function of a signal device according to the present invention.

The signal device 3 also can systematically execute a cellulating and decellulating process and an intra-office LAP control process for each remote device. As shown in FIG. 18, in the signal device 3, the signal terminal device 305 is systematically integrated with a CLAD unit 303-2 arranged for each remote device, and a LAP control unit 304. Like that shown in FIG. 17, the above configuration can identify the opposite remote device 4 by using the inputs VPI and VCI. In FIG. 18, numeral 306 shows a signal cell distributing device.

Figure 19:
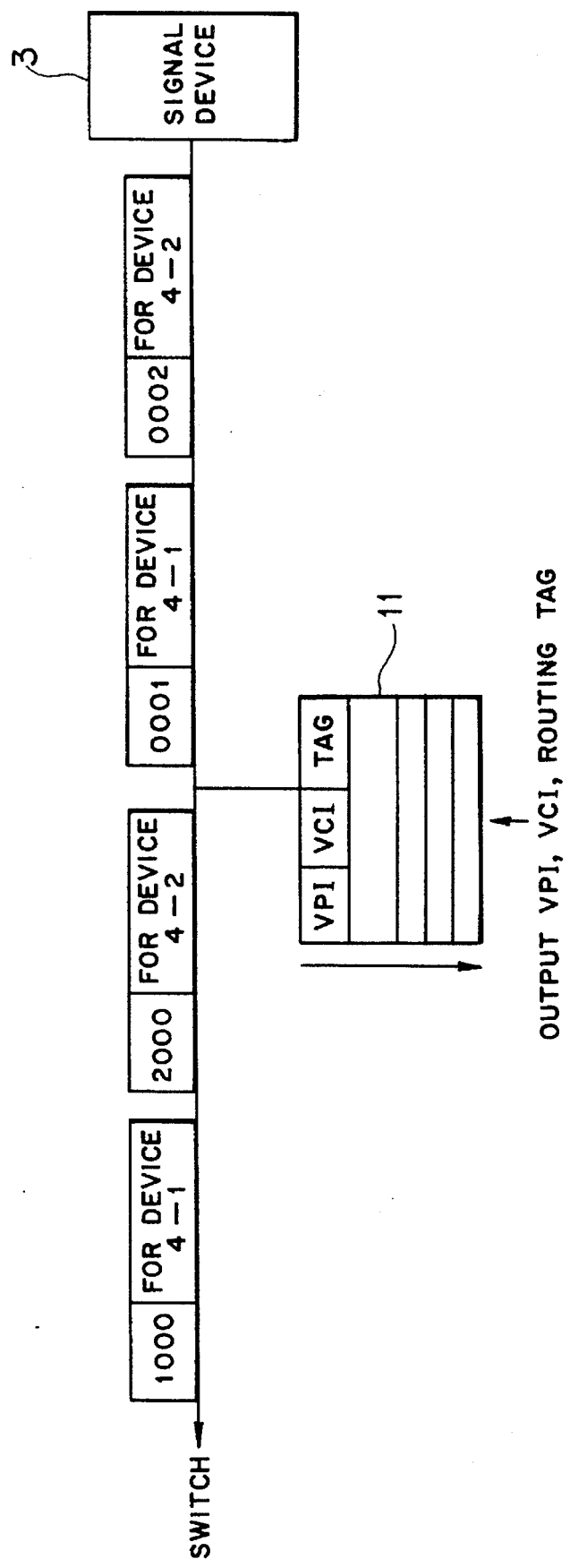
FIG. 19 is block diagram showing the function of an HCV device for a signal device according to the present invention.

The embodiment includes the HCV device 11 for converting a cell header from the signal device 3 to satisfy the condition of the cell header information (VPI, VCI and device control identifier) which are sent to the remote devices 4-1 and 4-2 by the signal device 3. FIG. 19 is a diagram explaining the function of the HCV device 11. For example, by processing once a cell corresponding to each remote device from the signal device 3 in the HCV device 11, the device 4-1 converts the cell header from "0001" to "1000" and the device 4-2 converts the cell header from "0002" to "2000". As a result, it is possible to realize the routing to an opposite remote device and the flexible VPI and VCI adding.

Figure 20:
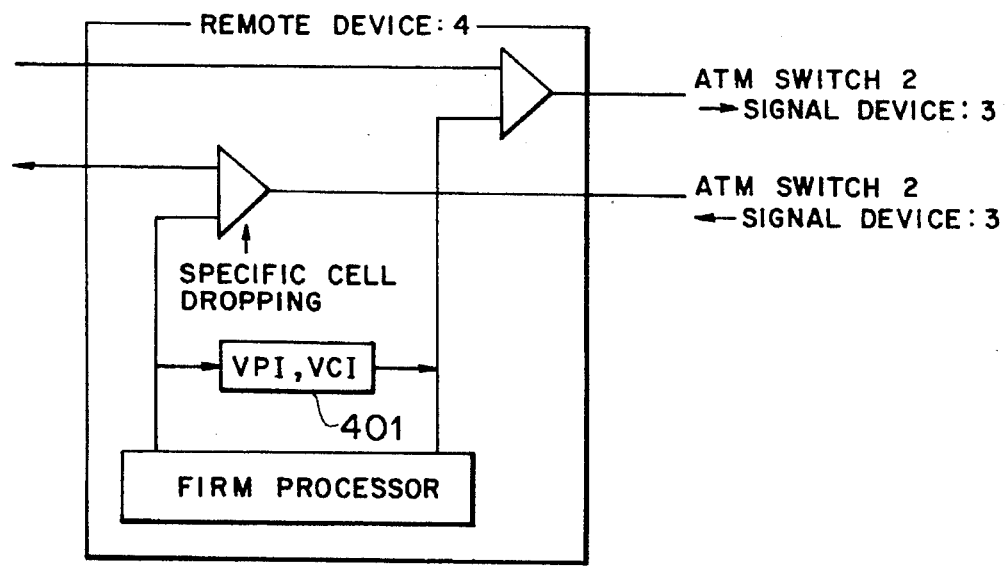
FIG. 20 is a block diagram showing the function of a remote device according to the present invention.

In the present embodiment, when the remote device 4, as shown in FIG. 20, receives an intra-office LAP establishing cell from the signal device, the VPI and VCI converting unit 401 converts the VPI and VCI to the VPI and VCI for returning cells as the intra-office LAP establishment completion information. After this step, the remote device 4 transmits a cell to the signal device 3 based on the information VPI and VCI. The remote device 4 can hold an input intra-office LAP establishment cell as VPI and VCI to use their values as outputs VPI and VCI.

Figure 21:
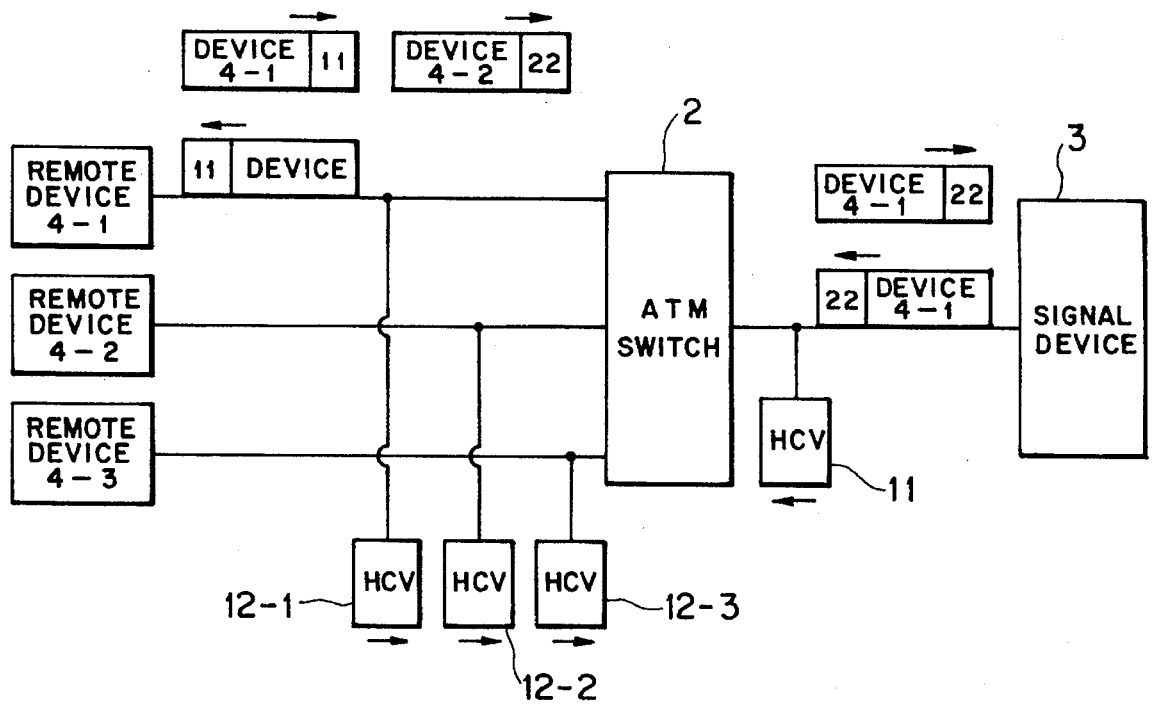
FIG. 21 is a block diagram showing the function of an HCV device for a remote device according to the present invention.

In order to identify respectively cells sent to the signal device 3 from plural remote devices 4-1, 4-2 and 4-3, as shown in FIG. 21, the headers (VPI and VCI) of the cell sent from each device is compared with the cell header values VPI and VCI sent to each of the devices 4-1, 4-2 and 4-3 from the signal device 3 to identify each of the remote devices.

In this case, as shown in FIG. 21, the HCV devices 12-1, 12-2 and 12-3 temporarily receives the cells from the remote devices to compare the cell header from each remote device with the cell header (VPI and VCI) sent from the signal device 3 to each device.

In other words, FIG. 21 is used to explain the system where the cell sent from the signal device 3 to each remote device is compared with the cell returned from each device to the signal device 3. Matching can easily established to the signal device 3 because the VPI and VCI values of the cell are same as the VPI and VCI values which have been returned to the corresponding remote device 4. This feature allows a single device 3 to control plural remote devices 4-1, 4-2 and 4-3.

Figure 22:
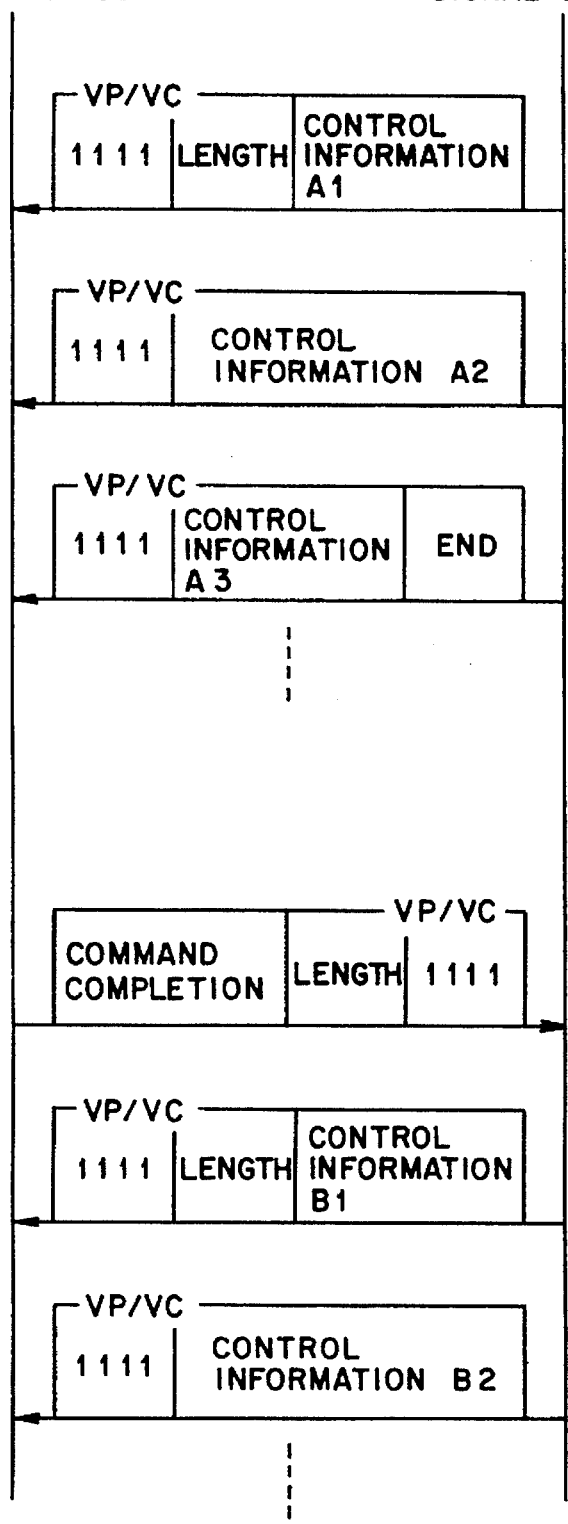
FIG. 22 is a diagram for explaining an interchange of information between a signal device and a remote device.

In order to simplify an interchange of control information between the signal device 3 and each remote device, only length regarding control information as a control information header may be added to a piece of control information so that a procedure can be performed that the following control information is not transmitted till an acknowledge character (ACK) response to each control information returns. That is, as shown in FIG. 22, the procedure is performed by merely adding the number (length) of the following cells to the first cell of control information as well as a final identifier to the last cell.

Figure 23:
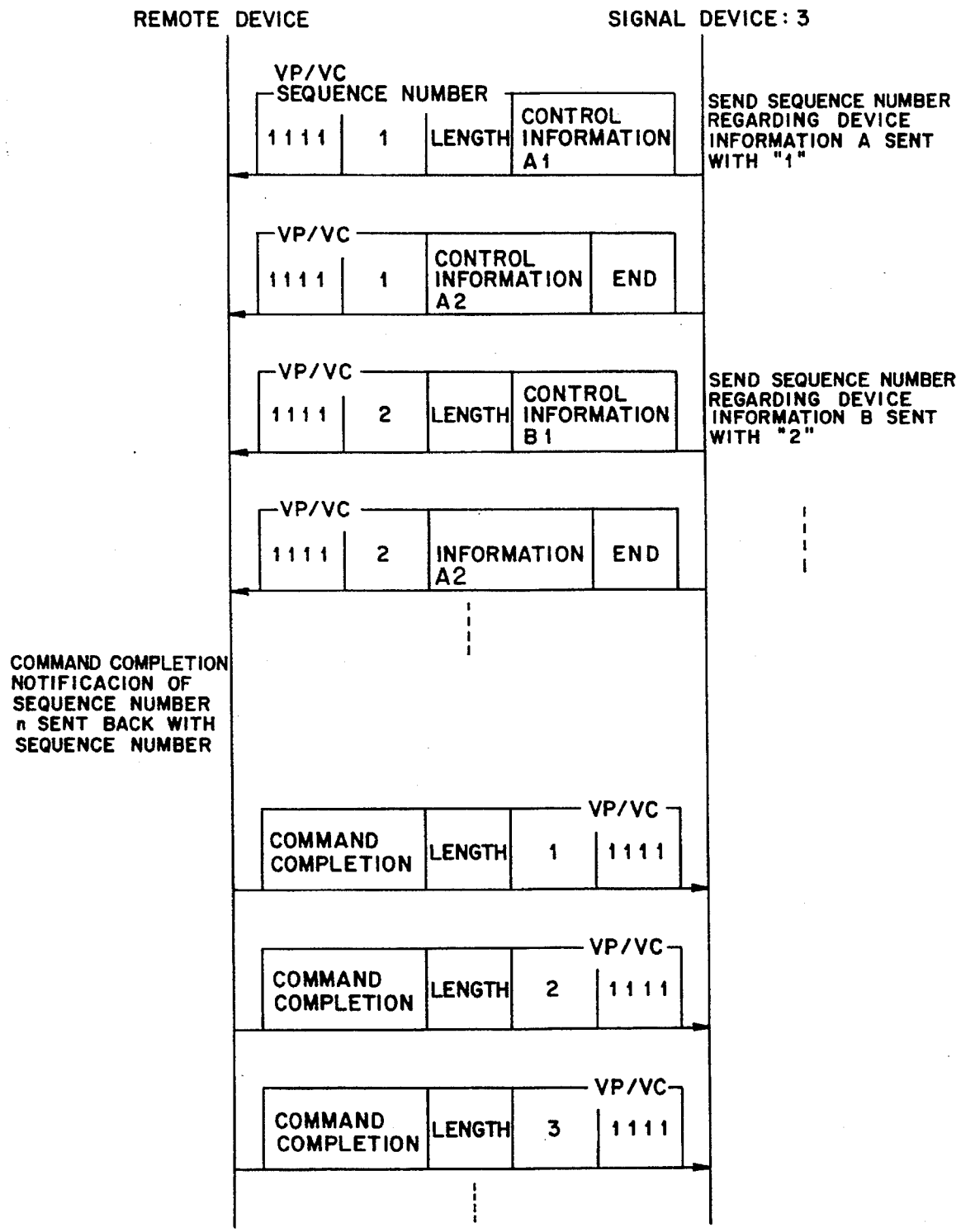
FIG. 23 is a diagram for explaining an interchange of information between a signal device and a remote device.

Furthermore, simplifying and multiplexing an interchange of control information between the signal device 3 and each remote device may be realized by adding a control length and a sequence number as a control information header to a piece of control information and by controlling the control information missed on way of communications with the sequence number. That is, as shown in FIG. 23, adding the call length and the sequence number to a cell allows transmitting multiplexed control information.

Hence, the above configuration can certainly control remote devices in multistage.

Figure 24:
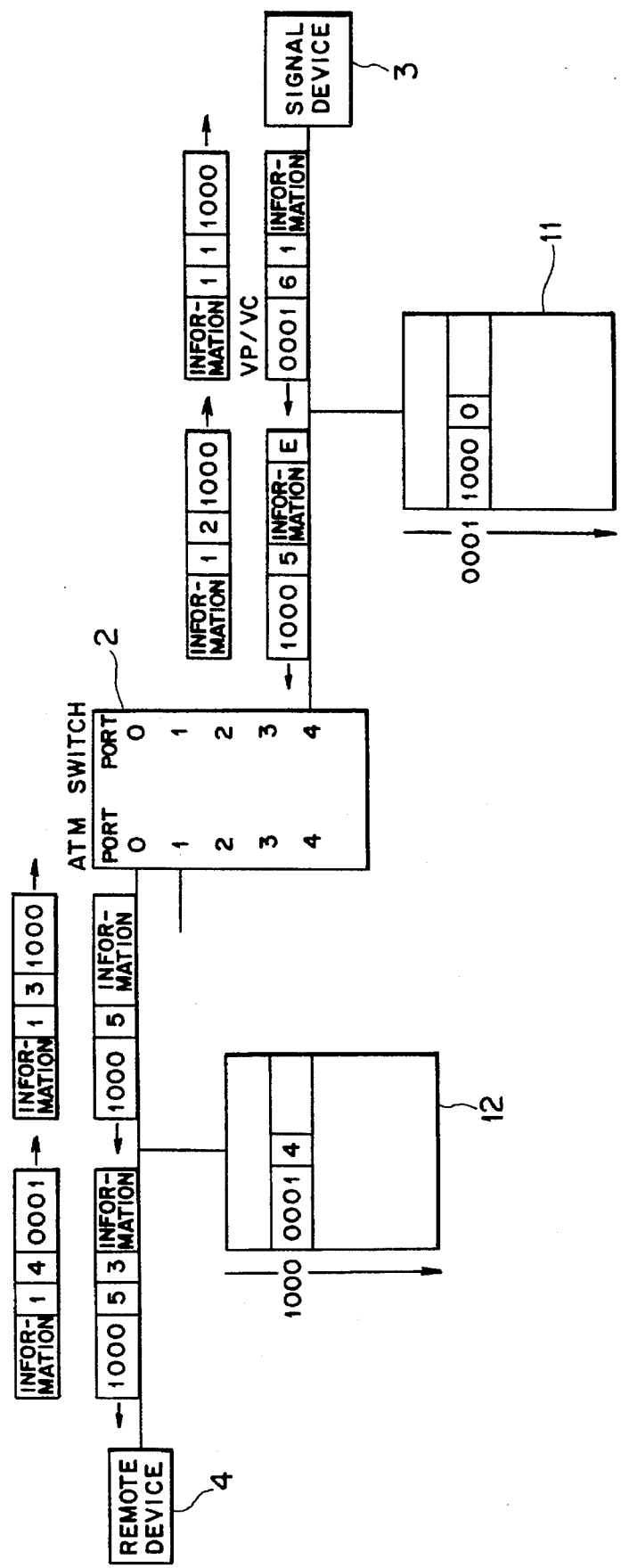
FIG. 24 is a block diagram for explaining an embodiment of the function of an HCV device for a signal device and the function of an HCV device for a remote device.

FIG. 24 illustrates the remote device 4 connected to the port "0" of the ATM switch 2 and the signal device 3 connected to the port "4" of the ATM switch 2.

In this case, the signal device 3 identifies the remote device 4 using a cell corresponding to (VPI and VCI)=0001. The HCV converter device 11 associated with the signal device 3 converts the cell to (VPI and VCI)=1000 and adds a tag to the result, thus sending the cell to the remote device 4.

The remote devices 4 monitor the overhead portion of the tag. If the tag represents a control identifier (not shown in FIG. 24), the corresponding remote device takes in it. Since the cell is (VPI and VCI)=1000, the remote device 4 sends out a cell corresponding to (VPI and VCI)=1000. Then the HCV device 12 converts the cell to (VPI and VCI)=0001 to set the tag to "4". Thus the signal device 3 receives the cell having the same VPI and VCI values as those of the cell sent, it can recognize the cell from a predetermined remote device 4.

Figure 25:
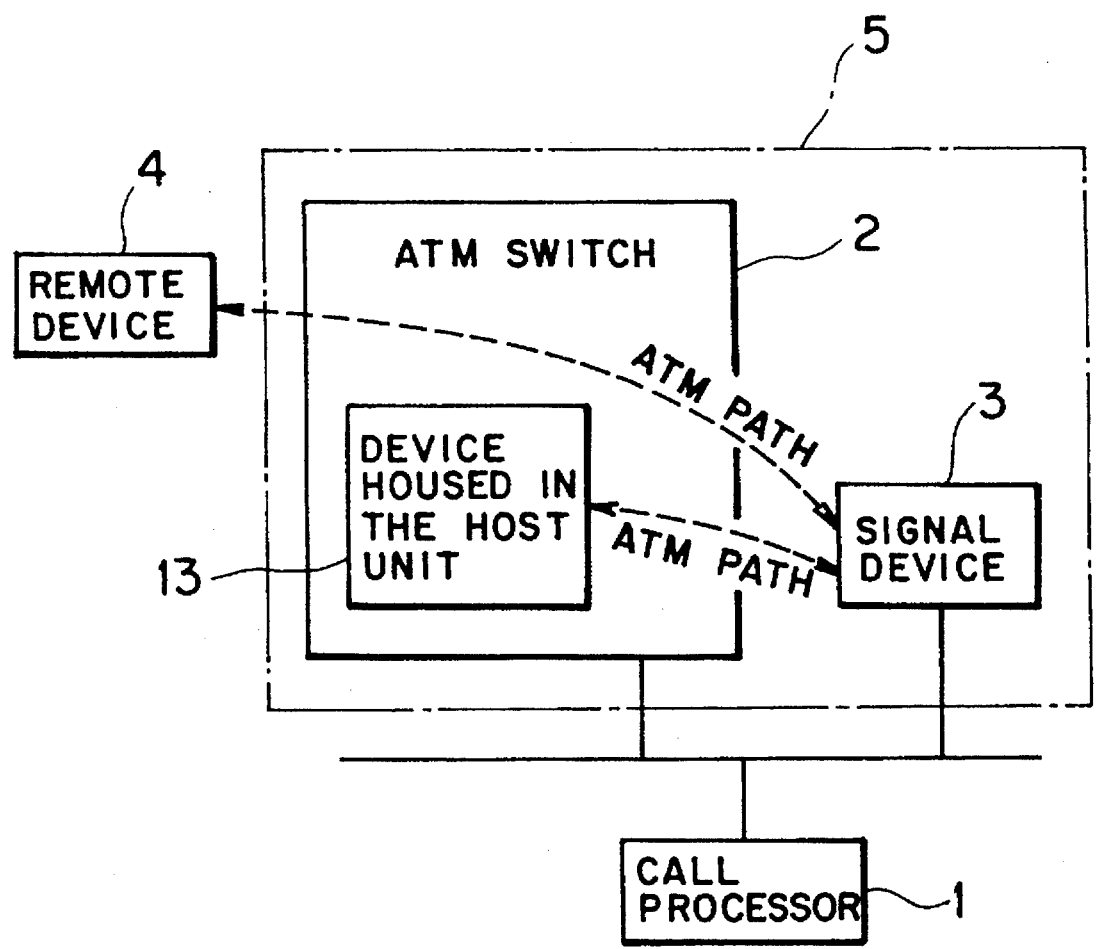
FIG. 25 is a block diagram showing another embodiment of the present invention.

The miscellaneous device is a remote device installed away from the ATM exchange. However, the miscellaneous device, as shown in FIG. 25, may be the device 13 housed in the host unit 5 in the ATM exchange. That is, like the remote device 4, a device 13, which is directly controlled by the call processor 3 and has a function similar to that of the remote device, can be controlled using the intra-office LAP (ATM path). This feature allows the similar-type device to be used if the device 13 having the function similar to that of the remote device is needed to install in the host unit 5. Therefore, there is an advantage in that the above configuration can reduce the hardware development amount, thus omitting new software development because the control system is of the same type.

The present invention is applicable to a network which corresponds generally to an exchange for handling a fixed length cell with a control field and an information field.

What is claimed is:

1. A system handling a fixed length cell having a control field and an information field, for controlling miscellaneous means connected thereto via a path on which the fixed length cell is transmitted, said system comprising a call processor and a signal device, said signal device including means for converting a control information from said call processor into a fixed length cell, said signal device notifying said miscellaneous means of the fixed length cell including said control information via said path to control said miscellaneous means.

2. The system according to claim 1, wherein said miscellaneous means is formed of plural groups each including miscellaneous devices, one of said miscellaneous device groups acting as a control device which once terminates control information from said call processor to control said miscellaneous device groups.

3. The system according to claim 1, wherein said control information includes identification information which indicates a miscellaneous device control cell.

4. The system according to claim 3, wherein said miscellaneous means includes plural miscellaneous devices to be controlled which are associated with a common route, said plural miscellaneous devices being respectively allocated to divided fields of an identifier.

5. The system according to claim 1, wherein said control information has virtual path identification information or virtual channel identification information which is set to a maximum value.

6. The system according to claim 5, wherein said miscellaneous means includes plural miscellaneous devices to be controlled which are associated with a common route, and wherein said virtual path identification information or said virtual channel information of said control information are respectfully allocated to said plural miscellaneous devices from a maximum set value in decreasing order by value.

7. The system according to claim 1, wherein said miscellaneous means includes plural miscellaneous devices to be controlled which are associated with a common route, one of said plural miscellaneous devices having a header conversion function of converting a cell header and a path connection function of setting a routing stage in a switch whereby a first path is formed from said signal device to a miscellaneous device nearest to said signal device; a second path is formed between a rear stage miscellaneous device by utilizing said first path; and a third path is formed between said second path and a rear stage miscellaneous device by utilizing said second path, whereby a path route can be extended toward rear stage miscellaneous devices.

8. The system according to claim 7, wherein path data are transferred at once to a specific miscellaneous device, said data being used for miscellaneous devices following said specific miscellaneous device to form a path to control said plural miscellaneous devices.

9. The system according to claim 1, wherein said miscellaneous means include plural miscellaneous devices and said signal device transmits control information to each of said plural miscellaneous devices to be controlled, said control information being used to identify said miscellaneous devices and including virtual path identification information and virtual channel identification information.

10. The system according to claim 9, wherein said signal device subjects each of said miscellaneous devices to a cellulating and decellulating process, and subjects each of said miscellaneous devices to a path control process.

11. The system according to claim 9, wherein said signal device systematically subjects each of additional devices to a cellulating or decellulating process and a path control process.

12. The system according to claim 9, wherein said signal device converts a cell header to satisfy the condition of said cell header which has been received by said miscellaneous means.

13. The system according to claim 1, wherein said miscellaneous means sends a path establishment completion notification to said signal device when said miscellaneous means receives a path establishment cell from said signal device, a virtual path identification information or virtual channel identification information of said path establishment cell being used as the virtual path identification information or virtual channel identification information of a return cell, and said miscellaneous means sends a cell in the following step in accordance with said virtual path identification information or said virtual channel identification information to said signal device.

14. The system according to claim 1, wherein said miscellaneous means includes plural miscellaneous devices of which each sends a cell header to said signal device to identify a cell from each miscellaneous device, said cell header from each miscellaneous device being compared with a virtual path identification information or a virtual channel identification information of a cell header sent from said signal device to each miscellaneous device to identify each miscellaneous device.

15. The system according to claim 14, wherein a cell header sent from each of said miscellaneous devices is compared with a virtual path information identification information or a virtual channel identification information of a cell header sent from said signal device via a header converter unit.

16. The system according to claim 1, wherein said miscellaneous means includes plural miscellaneous devices and wherein an interchange of control information between said signal device and each of said miscellaneous devices is simplified by providing only a length of control information as a header of a piece of control information, and by controlling so as not to transmit the next control information to be sent until a confirmation signal returns.

17. The system according to claim 1, wherein an interchange of control information between said signal device and said miscellaneous means is simplified and multiplexed by adding a control information length and a sequence number as a control information header to a piece of control information and by controlling a slip of control information on way of processing with said sequence number, whereby said multiplexing is realized.

18. The system according to claim 1, wherein said miscellaneous means comprises a remote device installed at a place away from an exchange.

19. The system exchange according to claim 1, wherein said miscellaneous means is arranged inside an exchange associated therewith.

20. An ATM exchange handling a fixed length cell having a control field and an information field, for controlling miscellaneous means connected thereto via ATM path on which the fixed length cell is transmitted, said ATM exchange comprising a call processor, and a signal device, said signal device converting a control information from said call processor into a fixed length cell and notifying said miscellaneous means of said fixed length cell including said control information via said ATM path to control said miscellaneous means.

21. The ATM exchange according to claim 20, wherein said control information includes identification information which indicates a miscellaneous device control cell.

22. The ATM exchange according to claim 20, wherein said control information has virtual path identification information or virtual channel identification information which is set to a maximum value.

23. The ATM exchange according to claim 20, wherein said miscellaneous means sends a path establishment completion notification to said signal device when said miscellaneous means receives a path establishment cell from said signal device, said path establishment cell including virtual path identification information or virtual channel identification information used as the virtual path identification information or virtual channel identification information of a return cell, and said miscellaneous means sends a cell in a following step in accordance with said virtual path identification information or said virtual channel identification information to said signal device.

24. The ATM exchange according to claim 20, wherein said miscellaneous means comprises a remote device installed at a place away from said exchange.

25. The ATM exchange according to claim 20, wherein said miscellaneous means is arranged inside said exchange.

26. A system handling a fixed length cell having a control field and an information field, for controlling a plurality of miscellaneous means each connected thereto via a path on which the fixed length cell is transmitted, said system comprising a call processor, and a signal device, said signal device converting a control information from said call processor into a fixed length cell and using the path to transmit said fixed length cell including said control information to the miscellaneous means and to control said connected miscellaneous means.

27. The system according to claim 26, wherein said plurality of miscellaneous devices are associated with a common route, said plurality of miscellaneous devices being respectively allocated to divided fields of an identifier.

28. The system according to claim 26, wherein said miscellaneous devices to be controlled are associated with a common route, one of said plurality of miscellaneous devices having a header conversion function of converting a cell header and a path connection function of setting a routing tag in a switch, wherein a first path is formed from said signal device to a miscellaneous device nearest to said signal device; a second path is formed between a rear stage miscellaneous device by utilizing said first path; and a third path is formed between said second path and a rear stage miscellaneous device by utilizing said second path, whereby a path route can be extended toward rear stage miscellaneous devices.

29. The system according to claim 28, wherein path data are transferred at once to a specific miscellaneous device, said data being used for miscellaneous devices following said specific miscellaneous device to form a path to control multistage miscellaneous devices.

30. The system according to claim 28, wherein said signal device transmits control information to each of said plurality of miscellaneous devices, said control information being used to identify said miscellaneous devices and including virtual path identification information and virtual channel identification information.

31. The system according to claim 30, wherein said signal device subjects each of said miscellaneous devices to a cellulating and decellulating process, and subjects each of said miscellaneous devices to a path control process.

32. A system handling a fixed length cell having a control field and an information field, for controlling a cell process unit connected thereto via a path on which the fixed length cell is transmitted, said system comprising a call processor and a signal device, said signal device including means for converting a control information from said call processor into a fixed length cell, said signal device notifying said cell process unit of the fixed length cell including said control information via said path to control said cell process unit.

33. An ATM exchange handling a fixed length cell having a control field and an information field, for controlling a cell process unit connected thereto via ATM path on which the fixed length cell is transmitted, said ATM exchange comprising a call processor, and a signal device, said signal device converting a control information from said call processor into a fixed length cell and notifying said cell process unit of said fixed length cell including said control information via said ATM path to control said cell process unit.

34. A system handling a fixed length cell having a control field and an information field, for controlling a plurality of cell process units each connected thereto via a path on which the fixed length cell is transmitted, said system comprising a call processor, and a signal device, said signal device converting a control information from said call processor into a fixed length cell and using the path to transmit said fixed length cell including said control information to the cell process units and to control said connected cell process units.

35. A method of controlling a data unit, connected to a switch unit for switching a fixed length cell having a control field and an information field via a path on which the fixed length cell is transmitted, said data unit processing the fixed length cell, the method comprising the steps of:

processing a control information for the data unit in a processor of the switch unit, converting the control information into a fixed length cell, and transmitting the fixed length cell to the data unit via the path.

* * * * *

UNITED STATES PATENT AND TRADEMARK OFFICE
CERTIFICATE OF CORRECTION

PATENT NO. : 5,568,479
DATED : 10-22-96
INVENTOR(S) : Yoshihiro WATANABE, et al

It is certified that error appears in the above-identified patent and that said Letters Patent is hereby corrected as shown below:

On the title page; item (73) should be corrected as follows:

Assignee: Fujitsu Limited, Kanagawa, Japan

Signed and Sealed this

Fourteenth Day of January, 1997

*Attest:*

BRUCE LEHMAN

*Attesting Officer*  *Commissioner of Patents and Trademarks*